United States Patent
Iwata et al.

(10) Patent No.: US 11,770,088 B2
(45) Date of Patent: *Sep. 26, 2023

(54) ELECTRIC POWER TOOL

(71) Applicant: Koki Holdings Co., Ltd., Tokyo (JP)

(72) Inventors: Kazutaka Iwata, Hitachinaka (JP); Toshiaki Koizumi, Hitachinaka (JP)

(73) Assignee: Koki Holdings Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/366,861

(22) Filed: Jul. 2, 2021

(65) Prior Publication Data
US 2021/0336575 A1  Oct. 28, 2021

Related U.S. Application Data

(63) Continuation of application No. 16/041,495, filed on Jul. 20, 2018, now Pat. No. 11,070,160, which is a (Continued)

(30) Foreign Application Priority Data

| Mar. 18, 2011 | (JP) | 2011-060833 |
| Mar. 18, 2011 | (JP) | 2011-060901 |
| Mar. 18, 2011 | (JP) | 2011-060932 |

(51) Int. Cl.
*H02P 27/06* (2006.01)
*H02P 6/10* (2006.01)
(Continued)

(52) U.S. Cl.
CPC ............ *H02P 27/06* (2013.01); *H02K 19/10* (2013.01); *H02P 6/10* (2013.01); *H02P 6/15* (2016.02);
(Continued)

(58) Field of Classification Search
CPC .................................. H02P 27/06; H02P 6/10
See application file for complete search history.

(56) References Cited

U.S. PATENT DOCUMENTS

| 4,454,573 A | 6/1984 | Petsch et al. |
| 4,489,261 A | 12/1984 | Hartwig et al. |
| (Continued) | | |

FOREIGN PATENT DOCUMENTS

| CN | 200988190 | 12/2007 |
| CN | 101391416 | 3/2009 |
| (Continued) | | |

OTHER PUBLICATIONS

U.S. Appl. No. 13/882,073, Final Office Action dated Mar. 2, 2017, 12 pages.
(Continued)

*Primary Examiner* — Said Bouziane
(74) *Attorney, Agent, or Firm* — Kilpatrick Townsend & Stockton LLP

(57) ABSTRACT

An electric power tool includes: a brushless motor having a plurality of stator windings and configured to rotate in accordance with voltages applied to the plurality of stator windings, an induced voltage being generated in accordance with a rotation of the brushless motor; a rectifier circuit configured to rectify an AC voltage; a smoothing capacitor configured to smooth the AC voltage rectified by the rectifier circuit to a pulsation voltage having a maximum value larger than the induced voltage and a minimum value smaller than the induced voltage; and an inverter circuit configured to perform switching operations to output the pulsation voltage to the plurality of stator windings by rotation.

8 Claims, 23 Drawing Sheets

Related U.S. Application Data continuation of application No. 13/882,073, filed as application No. PCT/JP2012/001898 on Mar. 19, 2012, now Pat. No. 10,033,323.

(51) Int. Cl.
  *H02P 6/28* (2016.01)
  *H02P 6/15* (2016.01)
  *H02P 27/04* (2016.01)
  *H02K 19/10* (2006.01)

(52) U.S. Cl.
  CPC ............... *H02P 6/157* (2016.02); *H02P 6/28* (2016.02); *H02P 27/04* (2013.01)

(56) References Cited

U.S. PATENT DOCUMENTS

| | | | |
|---|---|---|---|
| 4,513,230 | A | 4/1985 | Erdman |
| 4,556,827 | A | 12/1985 | Erdman |
| 4,766,963 | A | 8/1988 | Hartwig et al. |
| 5,402,045 | A | 3/1995 | Mori |
| 5,420,492 | A | 5/1995 | Sood et al. |
| 5,828,563 | A | 10/1998 | Suzuki et al. |
| 5,900,822 | A | 5/1999 | Sand et al. |
| 5,936,364 | A | 8/1999 | Ohsawa et al. |
| 6,123,158 | A | 9/2000 | Steffen |
| 6,150,784 | A | 11/2000 | Nagaoka |
| 6,866,105 | B2 | 3/2005 | Pfisterer et al. |
| 7,095,208 | B2 | 8/2006 | Kawaji et al. |
| 7,330,006 | B2 | 2/2008 | Iwata et al. |
| 7,334,648 | B2 | 2/2008 | Arimura |
| 8,067,913 | B2 | 11/2011 | Watabe et al. |
| 8,636,079 | B2 | 1/2014 | Totsu |
| 9,793,847 | B2 | 10/2017 | Iwata et al. |
| 10,033,323 | B2 | 7/2018 | Iwata et al. |
| 11,070,160 | B2 | 7/2021 | Iwata et al. |
| 2005/0264217 | A1 | 12/2005 | Huston et al. |
| 2007/0019933 | A1 | 1/2007 | Phillips et al. |
| 2007/0120519 | A1 | 5/2007 | Sakamoto et al. |
| 2007/0145919 | A1 | 6/2007 | Hamaoka et al. |
| 2007/0205665 | A1 | 9/2007 | Kawano et al. |
| 2007/0241720 | A1 | 10/2007 | Sakamoto et al. |
| 2007/0267990 | A1 | 11/2007 | Abolhassani et al. |
| 2009/0072839 | A1 | 3/2009 | Kim et al. |
| 2009/0096401 | A1 | 4/2009 | Watabe et al. |
| 2009/0201703 | A1 | 8/2009 | Klikic et al. |
| 2009/0243525 | A1* | 10/2009 | Ikeda .................. H02P 29/032 318/400.22 |
| 2009/0295313 | A1 | 12/2009 | Suzuki et al. |
| 2009/0308628 | A1 | 12/2009 | Totsu |
| 2010/0194315 | A1 | 8/2010 | Kusakawa et al. |
| 2010/0307782 | A1 | 12/2010 | Iwata et al. |
| 2010/0315027 | A1 | 12/2010 | Wystup et al. |
| 2011/0030981 | A1 | 2/2011 | Totsu |
| 2011/0031922 | A1 | 2/2011 | Sakai et al. |
| 2011/0140642 | A1 | 6/2011 | Kono et al. |
| 2011/0284255 | A1* | 11/2011 | Ookubo ................. H02P 23/03 173/117 |

FOREIGN PATENT DOCUMENTS

| | | |
|---|---|---|
| JP | 61170295 | 7/1986 |
| JP | 627800 | 2/1987 |
| JP | 496683 | 3/1992 |
| JP | 4368475 | 12/1992 |
| JP | 7231666 | 8/1995 |
| JP | 7308871 | 11/1995 |
| JP | 8196076 | 7/1996 |
| JP | 8300346 | 11/1996 |
| JP | 919156 | 1/1997 |
| JP | 947085 | 2/1997 |
| JP | 9304447 | 11/1997 |
| JP | 10150795 | 6/1998 |
| JP | 10225167 | 8/1998 |
| JP | 11113251 | 4/1999 |
| JP | 11341775 | 12/1999 |
| JP | 2000032771 | 1/2000 |
| JP | 2000032772 | 1/2000 |
| JP | 2000515435 | 11/2000 |
| JP | 2001286184 | 10/2001 |
| JP | 2002051589 | 2/2002 |
| JP | 2003284387 | 10/2003 |
| JP | 2004098282 | 4/2004 |
| JP | 2004320984 | 11/2004 |
| JP | 2006034001 | 2/2006 |
| JP | 2006055980 | 3/2006 |
| JP | 2006109624 | 4/2006 |
| JP | 2007000992 | 1/2007 |
| JP | 2007229891 | 9/2007 |
| JP | 2008005639 | 1/2008 |
| JP | 2008017649 | 1/2008 |
| JP | 2008043012 | 2/2008 |
| JP | 2008271687 | 11/2008 |
| JP | 2010012585 | 1/2010 |
| JP | 4487836 | 4/2010 |
| JP | 2010082761 | 4/2010 |
| JP | 2010120120 | 6/2010 |
| JP | 2010120121 | 6/2010 |
| JP | 2010173042 | 8/2010 |
| JP | 2010173053 | 8/2010 |
| JP | 2010179378 | 8/2010 |
| JP | 2010226842 | 10/2010 |
| JP | 2011020187 | 2/2011 |
| JP | 2012151918 | 8/2012 |
| JP | 5729597 | 4/2015 |
| JP | 5850215 | 12/2015 |
| JP | 5879712 | 2/2016 |
| WO | 9601521 | 1/1996 |
| WO | 0180414 | 10/2001 |

OTHER PUBLICATIONS

U.S. Appl. No. 13/882,073, Final Office Action dated Jan. 12, 2016, 15 pages.
U.S. Appl. No. 13/882,073, Non-Final Office Action dated Sep. 20, 2017, 10 pages.
U.S. Appl. No. 13/882,073, Non-Final Office Action dated May 26, 2016, 11 pages.
U.S. Appl. No. 13/882,073, Non-Final Office Action dated Apr. 29, 2015, 14 pages.
U.S. Appl. No. 13/882,073, Notice of Allowance dated Mar. 26, 2018, 9 pages.
U.S. Appl. No. 15/073,005, Final Office Action dated Dec. 30, 2016, 10 pages.
U.S. Appl. No. 15/073,005, Non-Final Office Action dated May 25, 2016, 12 pages.
U.S. Appl. No. 15/073,005, Notice of Allowance dated Jul. 27, 2017, 9 pages.
U.S. Appl. No. 16/041,495, Advisory Action dated Aug. 18, 2020, 3 pages.
U.S. Appl. No. 16/041,495, Corrected Notice of Allowability dated May 25, 2021, 3 pages.
U.S. Appl. No. 16/041,495, Final Office Action dated Apr. 28, 2020, 10 pages.
U.S. Appl. No. 16/041,495, Non-Final Office Action dated Sep. 26, 2019, 15 pages.
U.S. Appl. No. 16/041,495, Non-Final Office Action dated Oct. 26, 2020, 16 pages.
U.S. Appl. No. 16/041,495, Notice of Allowance dated Mar. 25, 2021, 19 pages.
Australian Application No. AU2012232581, First Examination Report dated Aug. 22, 2014, 5 pages.
Australian Application No. AU2015215860, First Examination Report dated Oct. 19, 2016, 5 pages.
Chinese Application No. CN201280008234.X, Office Action dated Apr. 30, 2015, 36 pages (14 pages of Original Document and 22 pages of English Translation).
Chinese Application No. CN201280008234.X, Office Action dated Jan. 4, 2016, 40 pages (16 pages of Original Document and 24 pages of English Translation).

(56) References Cited

OTHER PUBLICATIONS

European Application No. EP16161572.9, Extended European Search Report dated Aug. 18, 2016, 7 pages.
Japanese Application No. JP2011-060833, Notice of Decision to Grant dated Nov. 5, 2015, 6 pages (3 pages of Original Document and 3 pages of English Translation).
Japanese Application No. JP2011-060833, Office Action dated Oct. 23, 2014, 20 pages (12 pages of Original Document and 8 pages of English Translation).
Japanese Application No. JP2011-060833, Office Action dated Jun. 18, 2015, 6 pages (3 pages of Original Document and 3 pages of English Translation).
Japanese Application No. JP2011-060901, Notice of Decision to Grant dated Mar. 12, 2015, 6 pages (3 pages of Original Document and 3 pages of English Translation).
Japanese Application No. JP2011-060901, Office Action dated Aug. 4, 2014, 11 pages (6 pages of Original Document and 5 pages of English Translation).
Japanese Application No. JP2011-060932, Notice of Decision to Grant dated Jan. 5, 2016, 6 pages (3 pages of Original Document and 3 pages of English Translation).
Japanese Application No. JP2011-060932, Office Action dated Oct. 14, 2014, 16 pages (9 pages of Original Document and 7 pages of English Translation).
Japanese Application No. JP2011-060932, Office Action dated Jun. 4, 2015, 9 pages (5 pages of Original Document and 4 pages of English Translation).
Japanese Application No. JP2015-080305, Office Action dated Mar. 24, 2016, 7 pages (4 pages of Original Document and 3 pages of English Translation).
Japanese Application No. JP2016-018060, Office Action dated Nov. 17, 2016, 7 pages (4 pages of Original Document and 3 pages of English Translation).
International Application No. PCT/JP2012/001898, International Preliminary Report on Patentability dated Oct. 3, 2013, 7 pages.
International Application No. PCT/JP2012/001898, International Search Report and Written Opinion dated Sep. 25, 2012, 8 pages.
Russian Application No. RU2013134135, Office Action dated Mar. 10, 2015, 9 pages (6 pages of Original Document and 3 pages of English Translation).

* cited by examiner

ELECTRIC POWER TOOL

CROSS REFERENCE TO RELATED APPLICATION

This application is a continuation of U.S. application Ser. No. 16/041,495, filed Jul. 20, 2018, which is a continuation of U.S. application Ser. No. 13/882,073, filed Apr. 26, 2013, which claims priorities from Japanese Patent Application Nos. 2011-060932, 2011-060833, and 2011-060901, those filed Mar. 18, 2011. The entire contents of the above noted applications are incorporated herein by reference. Incidentally, the U.S. application Ser. No. 13/882,073 is entered into U. S. national phase from International Application No. PCT/JP2012/001898 filed Mar. 19, 2012 in Japan Patent Office as a Receiving Office, which claims the above described priorities.

TECHNICAL FIELD

The invention relates to an electric power tool.

BACKGROUND

Japanese Patent Publication No. 4487836 discloses an electric device that controls a motor with an inverter circuit to operate an end tool connected to the motor.

SUMMARY

Because the above conventional electric power tool includes a smoothing capacitor having large capacity, power factor of AC power is deteriorated.

Further, in order to improve the power factor, an electric power tool equipping with a power-factor improvement circuit can be also conceived. However, such configuration increases the size of the electric power tool and increases the cost.

In view of the foregoing, it is an object of the invention to provide an electric power tool capable of improving power factor without equipping with a power-factor improvement.

In order to attain the above and other objects, the invention provides an electric power tool including: a brushless motor having a plurality of stator windings and configured to rotate in accordance with voltages applied to the plurality of stator windings, an induced voltage being generated in accordance with a rotation of the brushless motor; a rectifier circuit configured to rectify an AC voltage; a smoothing capacitor configured to smooth the AC voltage rectified by the rectifier circuit to a pulsation voltage having a maximum value larger than the induced voltage and a minimum value smaller than the induced voltage; and an inverter circuit configured to perform switching operations to output the pulsation voltage to the plurality of stator windings by rotation.

It is preferable that the electric power tool further includes: a receiving unit configured to receive an instruction for the inverter circuit to perform the switching operations; and a control unit configured to control the inverter circuit to continue to perform the switching operations while the receiving unit is receiving the instruction, even if the pulsation voltage is smaller than the induced voltage.

It is preferable that the control unit prevents the inverter circuit from performing the switching operations when a current flowing through the brushless motor is larger than an overcurrent threshold.

Another aspect of the present invention provides an electric power tool including: a brushless motor including: a stator having a plurality of stator windings to which an AC voltage is applied from an AC power source; and a rotor rotatable for the stator; an end tool (designated by reference numeral 1a in FIG. 1) that is driven in accordance with the rotation of the rotor; an inverter circuit configured to perform switching operations to output the pulsation voltage to the plurality of stator windings by rotation, even if the AC voltage is smaller than a preset voltage.

Another aspect of the present invention provides an electric power tool including: a motor; a voltage supplying unit configured to supply a drive voltage to the motor; a current detecting circuit configured to detect a current flowing through the motor; and a control unit configured to control the voltage supplying unit to decrease the drive voltage when the current detected by the current detecting circuit is larger than a first current.

It is preferable that the control unit controls the voltage supplying unit to stop supplying the drive voltage when the current detected by the current detecting circuit is larger than a second current larger than the first current.

It is preferable that the voltage supplying unit supplies a pulsation voltage including a plurality of ripples as the drive voltage to the motor. The current detecting circuit detects a peak of the current flowing through the motor. The control unit controls the voltage supplying unit to decrease the drive voltage when the peak detected by the current detecting circuit is larger than the first current, keep the decreased drive voltage until a next peak is detected, and increases the decreased drive voltage stepwise if the next peak is smaller than the first current.

It is preferable that the voltage supplying unit includes an inverter circuit.

Another aspect of the present invention provides an electric power tool including: a motor; a voltage supplying unit configured to supply a drive voltage set to a target voltage to the motor; a rotational speed detecting circuit configured to detect a rotational speed of the motor; and a control unit configure to change the target voltage based on the rotational speed detected by the rotational speed detecting unit.

Another aspect of the present invention provides an electric power tool including: a power cable connectable to an AC power source; a brushless motor that is rotated with a power supplied from the AC power source; an end tool that is driven in accordance with the rotation of the brushless motor; a current detecting circuit configured to detect a current flowing through the brushless motor; and a control unit configured to decrease a drive voltage of the brushless motor when the current detected by the current detecting circuit is larger than a preset current value.

It is preferable that the control unit gradually decreases the drive voltage when the current detected by the current detecting circuit is larger than the preset current value.

It is preferable that the control unit performs a PWM control to decrease the drive voltage. The control unit performs the PWM control with a duty smaller than 100% when the current detected by the current detecting circuit is larger than the preset current value. The control unit performs the PWM control with a duty of 100% when the current detected by the current detecting circuit is smaller than the preset current value.

Another aspect of the present invention provides an electric power tool including: a power cable connectable to an AC power source; a brushless motor that is rotated with an AC power supplied from the AC power source, a pulsation current flowing through the brushless motor with the AC power; an end tool that is driven in accordance with the rotation of the brushless motor; a current detecting circuit configured to detect the pulsation current flowing through the brushless motor; and a restraining unit configured to retrain a peak of the pulsation current flowing through the brushless motor.

It is preferable that the restraining unit performs a PWM control to retrain a peak of the pulsation current flowing through the brushless motor.

Another aspect of the present invention provides an electric power tool including: a motor; a voltage supplying unit configured to generate a drive voltage from a DC voltage and supply the drive voltage to the motor; a voltage detecting circuit configured to detect the DC voltage; and a control unit configured to prohibit the voltage supplying unit from supplying the drive voltage to the motor when the DC voltage detected by the voltage detecting circuit is outside a preset range.

Another aspect of the present invention provides an electric power tool including: a motor; a rectifier circuit configured to convert an AC voltage into a rectified voltage; a voltage supplying unit configured to generate a drive voltage from the rectified voltage and supply the drive voltage to the motor; a voltage detecting circuit configured to detect the rectified voltage; and a control unit configured to prohibit the voltage supplying unit from supplying the drive voltage to the motor when the rectified voltage detected by the voltage detecting circuit is outside a preset range.

It is preferable that the voltage detecting circuit detects a peak of the rectified voltage. The control unit prohibits the voltage supplying unit from supplying the drive voltage to the motor when the rectified voltage detected by the voltage detecting circuit is outside the preset range.

Another aspect of the present invention provides an electric power tool including: a power cable connectable to an AC power source; a voltage supplying unit configured to generate a drive voltage from the power supplied from the AC power source; a brushless motor that is rotated with the drive voltage; an end tool that is driven in accordance with the rotation of the brushless motor; a current detecting circuit configured to detect a current flowing through the brushless motor; and a control unit configured to perform a PWM control to control the voltage supplying unit. The control unit determines a duty of the PWM control based on a difference between the current detected by the current detecting circuit and a first current value when the current detected by the current detecting circuit is larger than the first current value.

Another aspect of the present invention provides an electric power tool including: a power cable connectable to an AC power source; a voltage supplying unit configured to generate a drive voltage from the power supplied from the AC power source; a brushless motor that is rotated with the drive voltage; an end tool that is driven in accordance with the rotation of the brushless motor; a current detecting circuit configured to detect a current flowing through the brushless motor; and a control unit configured to perform a PWM control to control the voltage supplying unit. The control unit decreases a duty of the PWM control when the drive voltage is larger than a first voltage value.

Another aspect of the present invention provides an electric power tool including: a power cable connectable to an AC power source; a voltage supplying unit configured to generate a drive voltage from the power supplied from the AC power source; a brushless motor that is rotated with the drive voltage; an end tool that is driven in accordance with the rotation of the brushless motor; a voltage detecting circuit configured to detect the drive voltage; and a control unit configured to perform a PWM control to control the voltage supplying unit. The control unit determines a duty of the PWM control based on a difference between the voltage detected by the voltage detecting circuit and a first voltage value when the voltage detected by the voltage circuit is larger than the first voltage value.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Hereinafter, an electric power tool 1A according to a first embodiment of the invention will be described while referring to FIGS. 1 through 5.

Figure 1:
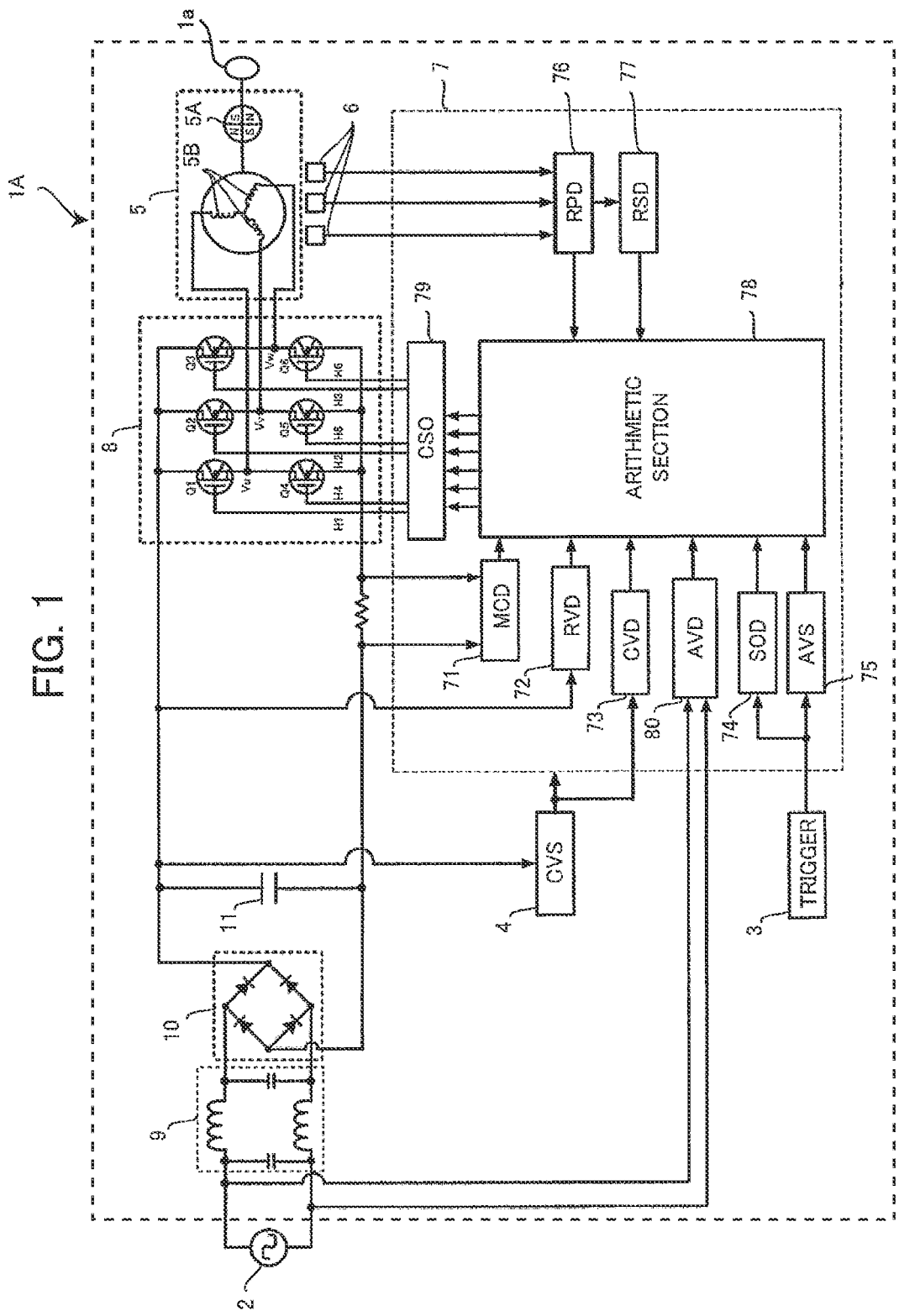
FIG. 1 is a circuit diagram of an electric power tool according to a first embodiment of the present invention.

FIG. 1 is a circuit diagram of the electric power tool 1A according to the first embodiment. As shown in FIG. 1, the electric power tool 1A includes a trigger switch (the receiving unit of the present invention) 3, a control-circuit-voltage supplying circuit (referred as "CVS" in FIG. 1) 4, a motor 5, rotor-position detecting elements 6, a controller 7, an inverter circuit (the inverter circuit and the voltage supplying unit of the present invention) 8, a normal-mode filter 9, a rectifier circuit 10, and a smoothing capacitor 11.

When the trigger switch 3 is operated, AC voltage outputted from a commercial power source 2 is rectified and smoothed by the rectifier circuit 10 and the smoothing capacitor 11, and is supplied to the motor 5 via the inverter circuit 8. Further, when the trigger switch 3 is operated, the control-circuit-voltage supplying circuit 4 generates a control-circuit driving voltage (15V in the present embodiment) and supplies the control-circuit driving voltage to the controller 7.

The motor 5 is a three-phase brushless DC motor, and includes a rotor 5A and a stator 5B. The rotor 5A is made of a permanent magnet including a plurality of sets (two sets in the present embodiment) of N poles and S poles. The stator 5B is made of three-phase stator windings U, V, and W that are connected by star connection. The motor 5 (the rotor 5A) rotates by sequentially switching the stator windings U, V, and W through which current flows. Switching of the stator windings U, V, and W will be described later.

The rotor-position detecting elements 6 are arranged at positions confronting the permanent magnet of the rotor 5A with a predetermined interval (for example, an angle of 60 degrees) in the circumferential direction of the rotor 5A. The rotor-position detecting elements 6 output a signal in accordance with rotational position of the rotor 6A.

The controller 7 includes a motor-current detecting circuit (the current detecting unit of the present invention) (referred as "MCD" in FIG. 1) 71, a rectified-voltage detecting circuit (the voltage detecting unit of the present invention) (referred as "RVD" in FIG. 1) 72, a control-circuit-voltage detecting circuit (referred as "CVD" in FIG. 1) 73, a switch-operation detecting circuit (referred as "SOD" in FIG. 1) 74, an applied-voltage setting circuit (referred as "AVS" in FIG. 1) 75, a rotor-position detecting circuit (referred as "RPD" in FIG. 1) 76, a motor-rotational-speed detecting circuit (the rotational speed detecting unit of the present invention) (referred as "RSD" in FIG. 1) 77, an arithmetic section (the control unit of the present invention) 78, a control-signal outputting circuit (referred as "CSO" in FIG. 1) 79, and an AC-input-voltage detecting circuit (referred as "AVD" in FIG. 1) 80.

The AC-input-voltage detecting circuit 80 detects a peak value of AC voltage outputted from the commercial power source 2, and outputs the peak value to the arithmetic section 78. In the present embodiment, AC voltage is detected in a sampling period that a value sufficiently close to the actual peak value can be detected.

The motor-current detecting circuit 71 detects current supplied to the motor 5, and outputs the current to the arithmetic section 78. The rectified-voltage detecting circuit 72 detects voltage outputted from the rectifier circuit 10 and the smoothing capacitor 11, and outputs the voltage to the arithmetic section 78. The control-circuit-voltage detecting circuit 73 detects control-circuit driving voltage supplied from the control-circuit-voltage supplying circuit 4, and outputs the driving voltage to the arithmetic section 78. The switch-operation detecting circuit 74 detects whether the trigger switch 3 is operated, and outputs the detection result to the arithmetic section 78. The applied-voltage setting circuit 75 detects operation amount of the trigger switch 3, and outputs the operation amount to the arithmetic section 78.

The rotor-position detecting circuit 76 detects rotational position of the rotor 6A based on signals from the rotor-position detecting elements 6, and outputs the rotational position to the motor-rotational-speed detecting circuit 77 and the arithmetic section 78. The motor-rotational-speed detecting circuit 77 detects rotational speed of the rotor 6A based on signals from the rotor-position detecting circuit 76, and outputs the rotational speed to the arithmetic section 78.

The arithmetic section 78 generates switching signals H1-H6 based on signals from the rotor-position detecting circuit 76 and from the motor-rotational-speed detecting circuit 77, and outputs the switching signals H1-H6 to the control-signal outputting circuit 79. Further, the arithmetic section 78 adjusts switching signals H4-H6 as pulse width modulation signal (PWM signal) based on signals from the applied-voltage setting circuit 75, and outputs the PWM signal to the control-signal outputting circuit 79. The switching signals H1-H6 are outputted to the inverter circuit 8 via the control-signal outputting circuit 79. Note that the controller 7 may be so configured to adjust the switching signals H1-H3 as PWM signals.

The inverter circuit 8 includes switching elements Q1-Q6. Each gate of the switching elements Q1-Q6 is connected with the control-signal outputting circuit 79, and each drain or source of the switching elements Q1-Q6 is connected with the stator windings U, V, and W of the stator 5B.

The switching elements Q1-Q6 performs switching operations based on the switching signals H1-H6 inputted from the control-signal outputting circuit 79, changes DC voltage of the battery pack 20 applied to the inverter circuit 8 into three-phase (U-phase, V-phase, and W-phase) voltages Vu, Vv, and Vw, and supplies the three-phase voltages Vu, Vv, and Vw to the stator windings U, V, and W, respectively.

Specifically, the switching signals H1-H6 are inputted to the switching elements Q1-Q6, respectively. With this operation, the energized stator windings U, V, and W, that is, the rotational direction of the rotor 5A is controlled. At this time, amount of electric power supplied to the stator windings U, V, and W is controlled with the switching signals H4-H6 which are also PWM signals.

With the above-described configuration, the electric power tool 1A can supply the motor 5 with driving voltage in accordance with the operation amount of the trigger switch 3.

Here, because a conventional electric power tool includes a smoothing capacitor having large capacity, power factor of AC power is deteriorated. Further, in order to improve the power factor, a configuration equipping with a power-factor improvement circuit can be also conceived. However, such configuration increases the size of the power tool and increases the cost.

On the other hands, a smoothing capacitor having small capacity cannot completely smooth AC voltage outputted from the rectifier circuit 10. As the result, pulsation voltage including ripples (for example, FIG. 2(*b*)) is outputted from the smoothing capacitor.

Figure 4:
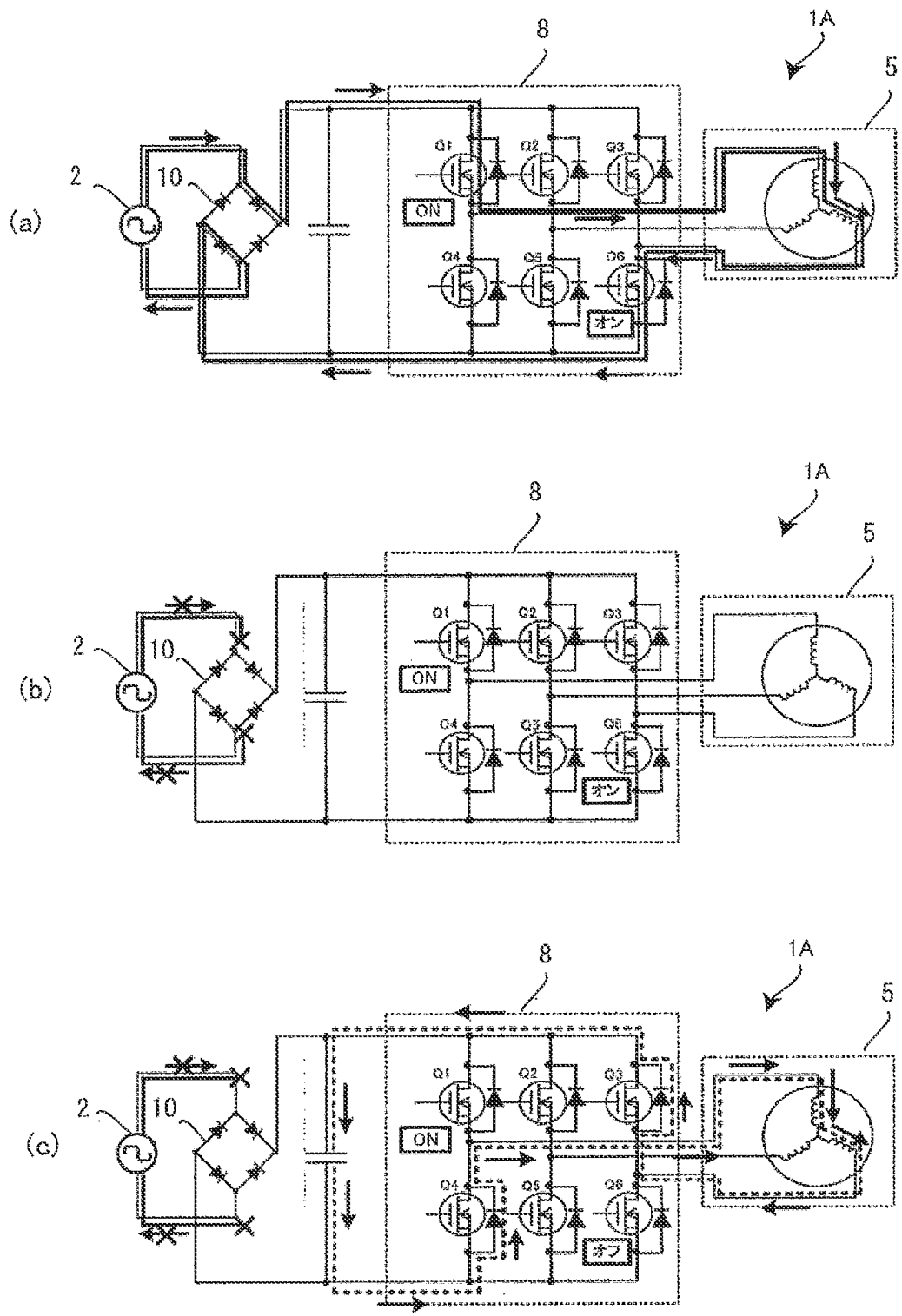
FIG. 4 is a diagram showing current paths for operations of an inverter circuit according to the first embodiment of the present invention.
Figure 5:
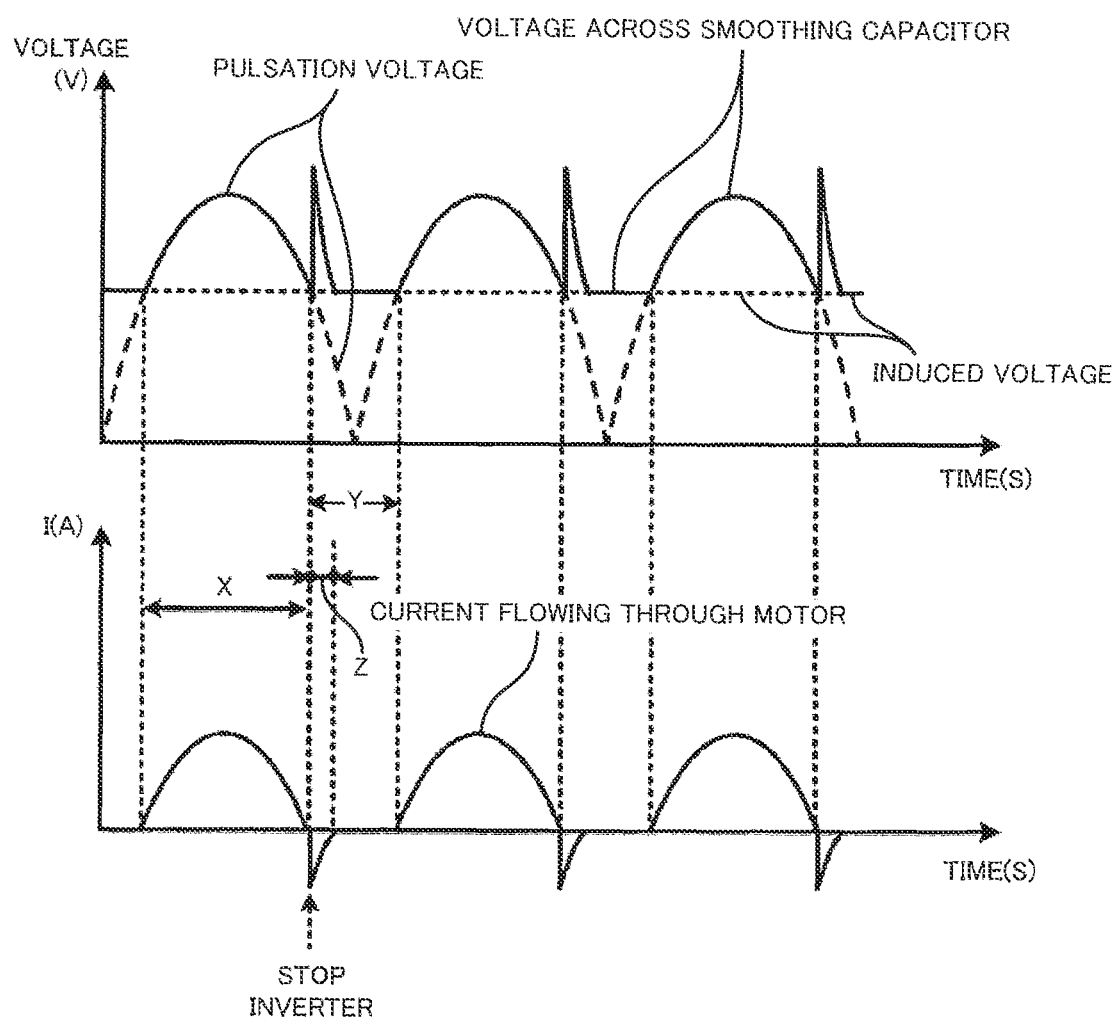
FIG. 5 is a diagram showing change of current when the inverter circuit is stopped.

When the motor 5 is rotated, induced voltage is generated in the motor 5. In order to the motor 5, it is required to apply voltage larger than the induced voltage to the motor 5. Thus, if the pulsation voltage is applied to the motor 5, the motor 5 cannot be driven in a section Y (FIG. 3) where the magnitude of the pulsation voltage is smaller than the induced voltage. That is, as shown in FIG. 4(*a*), current flows in the electric power tool 1A in a section X where the magnitude of the pulsation voltage is larger than or equal to the induced voltage. In contrast, as shown in FIG. 4(*b*), current does not flow in the electric power tool 1A in the section Y where the magnitude of the pulsation voltage is smaller than the induced voltage.

However, the electric power tool 1A according to the present embodiment uses the smoothing capacitor 11 having small capacity, by design, that outputs pulsation voltage having maximum voltage larger than the induced voltage and minimum voltage smaller than the induced voltage to generate the section Y. Hereinafter, the reason why the electric power tool 1A according to the present embodiment uses the smoothing capacitor 11 having small capacity will be described.

Figure 2:
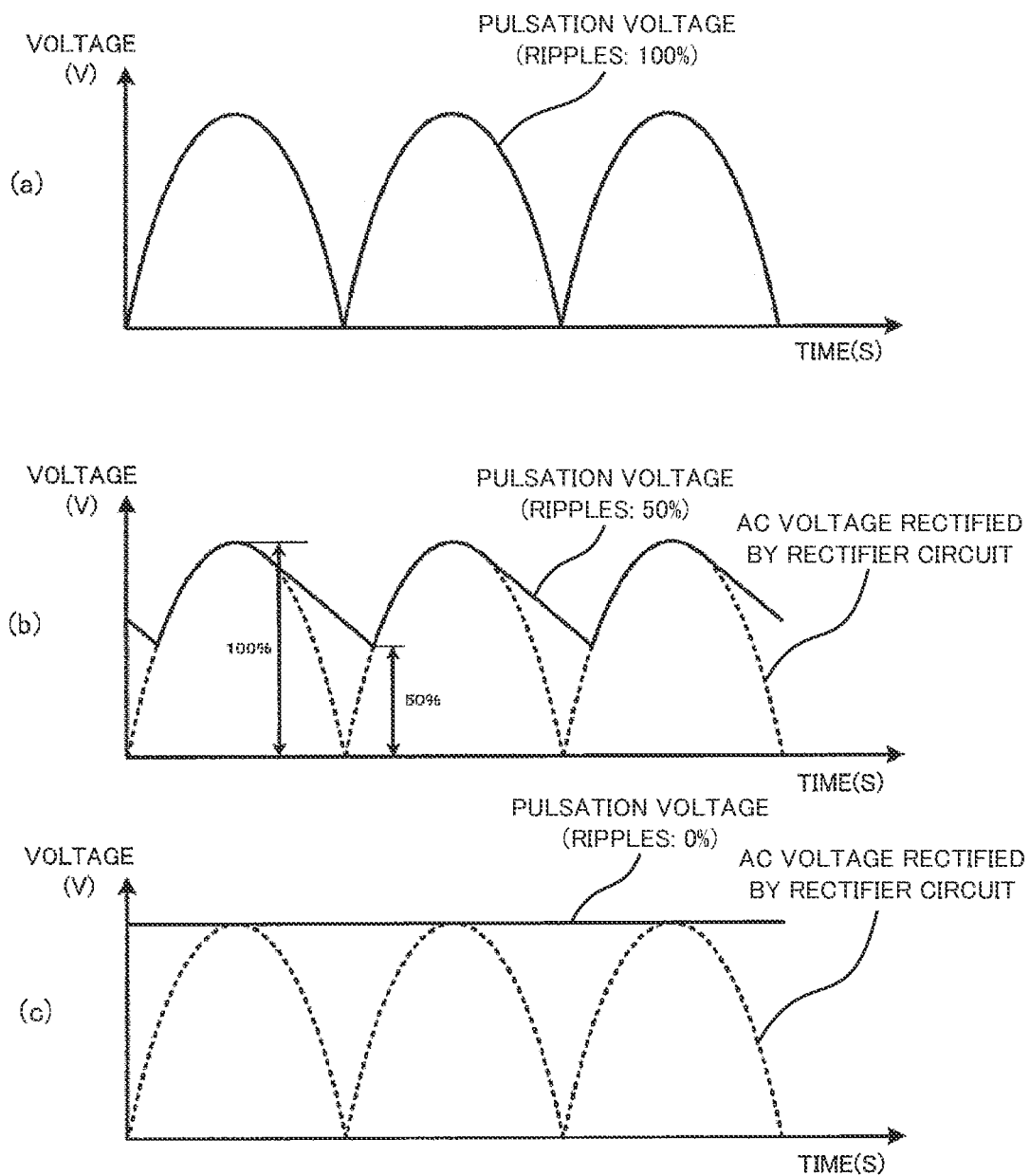
FIG. 2 is an explanation diagram of pulsation voltages including ripples.
Figure 3:
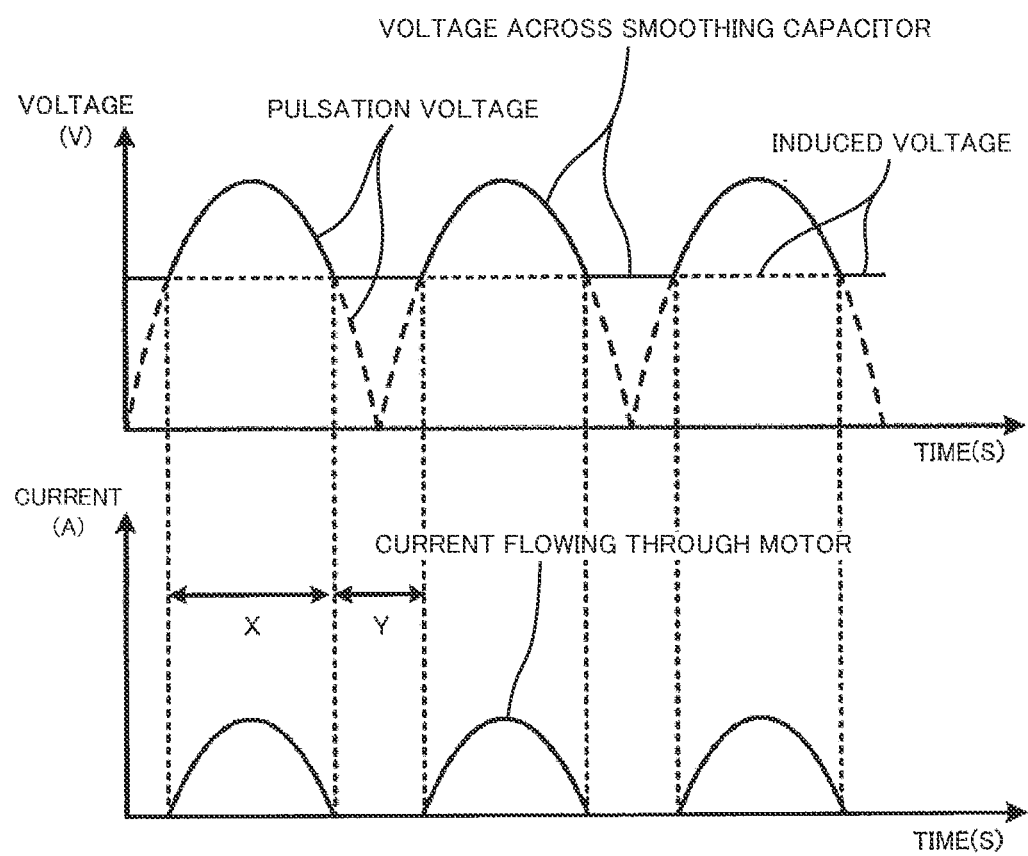
FIG. 3 is a diagram showing change of current when a smoothing capacitor having small capacitor is used.

FIG. 2(*a*) shows voltage waveforms in which ripples are 100%, FIG. 2(*b*) shows voltage waveforms in which ripples are 50%, and FIG. 2(*c*) shows voltage waveforms in which ripples are 0%. As shown in FIG. 2, the ratio of ripples decreases as the capacity of the smoothing capacitor 11 increases. In the present embodiment, the capacity of the smoothing capacitor 11 is determined based on both this relationship (between the ratio of ripples and the capacity of the smoothing capacitor 11) and the induced voltage. Hereinafter, a case will be described in which pulsation voltage including ripples of 100% is outputted from the smoothing capacitor 11.

As described above, current does not flow in the electric power tool 1A in the section Y. However, if the motor 5 is once driven in the section X, the motor 5 can continue rotating in the section Y due to inertia. Therefore, if the motor 5 is cyclically driven in the section X, the motor 5 can continue rotating even if not driven in the section Y. Hence, the electric power tool 1A according to the present embodiment can improve the power factor without equipping with the power-factor improvement circuit with the smoothing capacitor 11 having small capacity that outputs pulsation voltage having maximum voltage larger than the induced voltage and minimum voltage smaller than the induced voltage to generate the section Y.

Further, for saving energy, a control that stops operations of the inverter circuit 8 in the section Y where the magnitude of pulsation voltage is smaller than the induced voltage is conceivable.

However, if the inverter circuit 8 is stopped in the section Y, energy stored in the stator windings U, V, and W of the motor 5 flows reversely toward the smoothing capacitor 11 (FIG. 4(*c*)) in a section Z (FIG. 5) that is immediately after the inverter circuit 8 is stopped. As a result, voltage of the smoothing capacitor 11 increases rapidly, which can cause damage and deterioration of quality of the smoothing capacitor 11.

Hence, in the present embodiment, while the trigger switch 3 is operated, the inverter circuit 8 is controlled not so as to stop operations even in the section Y where the magnitude of pulsation voltage is smaller than the induced voltage. This control can prevent energy stored in the stator windings U, V, and W of the motor 5 from flowing reversely toward the smoothing capacitor 11, and the voltage of the smoothing capacitor 11 from increasing rapidly. Hence, damage and deterioration of quality of the smoothing capacitor 11 can be prevented.

However, the inverter circuit 8 may be controlled to stop operations if current detected by the motor-current detecting circuit 71 exceeds an overcurrent threshold.

Further, the above control that does not stop operations of the inverter circuit 8 while the trigger switch 3 is operated can be also used in a construction that does not equip with the smoothing capacitor 11.

Next, an electric power tool 1B according to a second embodiment of the invention will be described while referring to FIGS. 6 through 10. The electric power tool 1B has an identical circuit configuration (FIG. 1) as the electric power tool 1A according to the first embodiment. Therefore, the descriptions of the circuit configuration are omitted.

Figure 6:
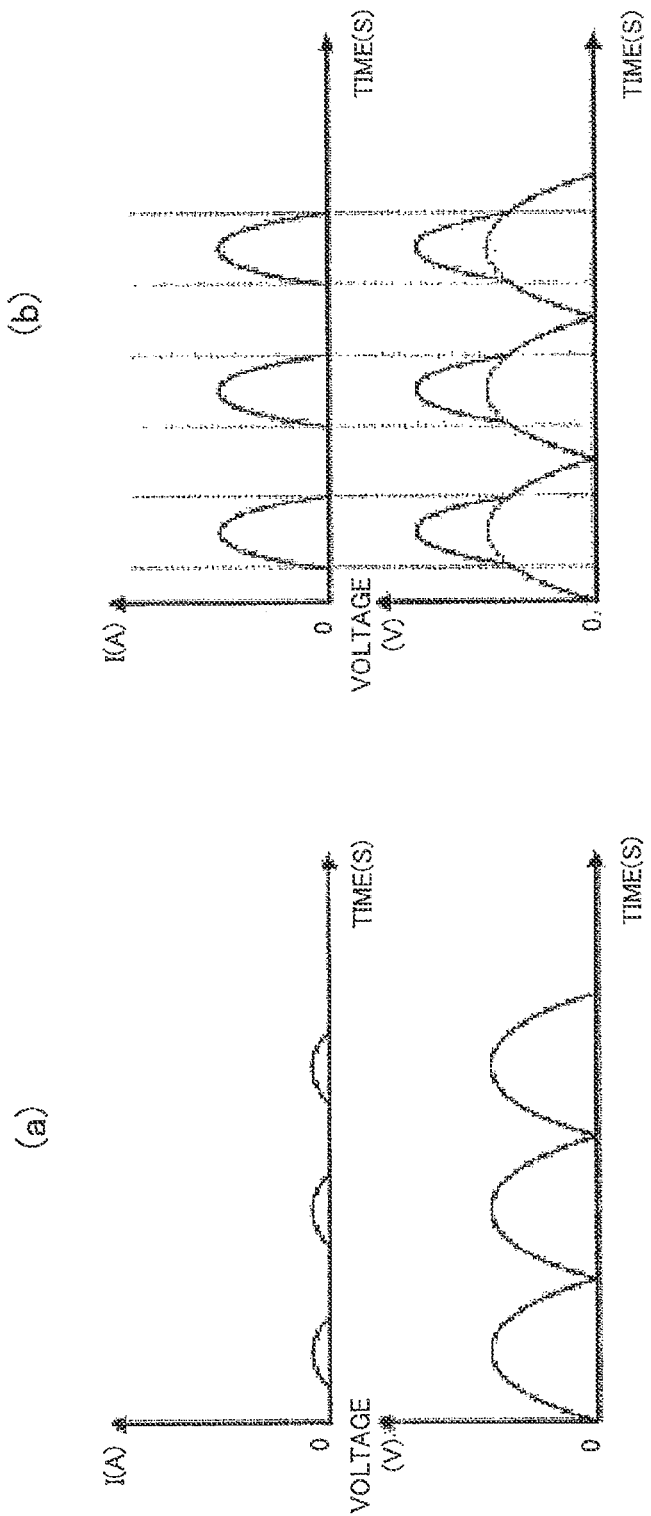
FIG. 6 is a diagram showing a relationship between current flowing through a motor and rectified voltage.

The inverter circuit 8 needs to be driven by voltage within a usable range R1 (FIG. 7) (for example, rectified voltage of approximately 110 to 200V, effective value of AC input voltage of approximately 80 to 120V, max (peak) value of AC input voltage of approximately 120 to 140V). FIG. 6(*a*) shows a relationship between current flowing through the motor 5 and the rectified voltage outputted from the rectifier circuit 10 at a normal condition. However, as shown in FIG. 6(*b*), if current flowing through the motor 5 is large, voltage generated from L component in the circuit can be superimposed onto the rectified voltage outputted from the rectifier circuit 10. If this voltage does not fall within the usable range R1 of the inverter circuit 8, the inverter circuit 8 can be damaged.

Thus, the electric power tool 1B of the present embodiment prohibits (restricts) supplying of electric power to the motor 5, if voltage outside a preset range R2 (FIG. 7) that falls into the usable range R1 is supplied to the inverter circuit 8 (the arithmetic section 78).

Figure 7:
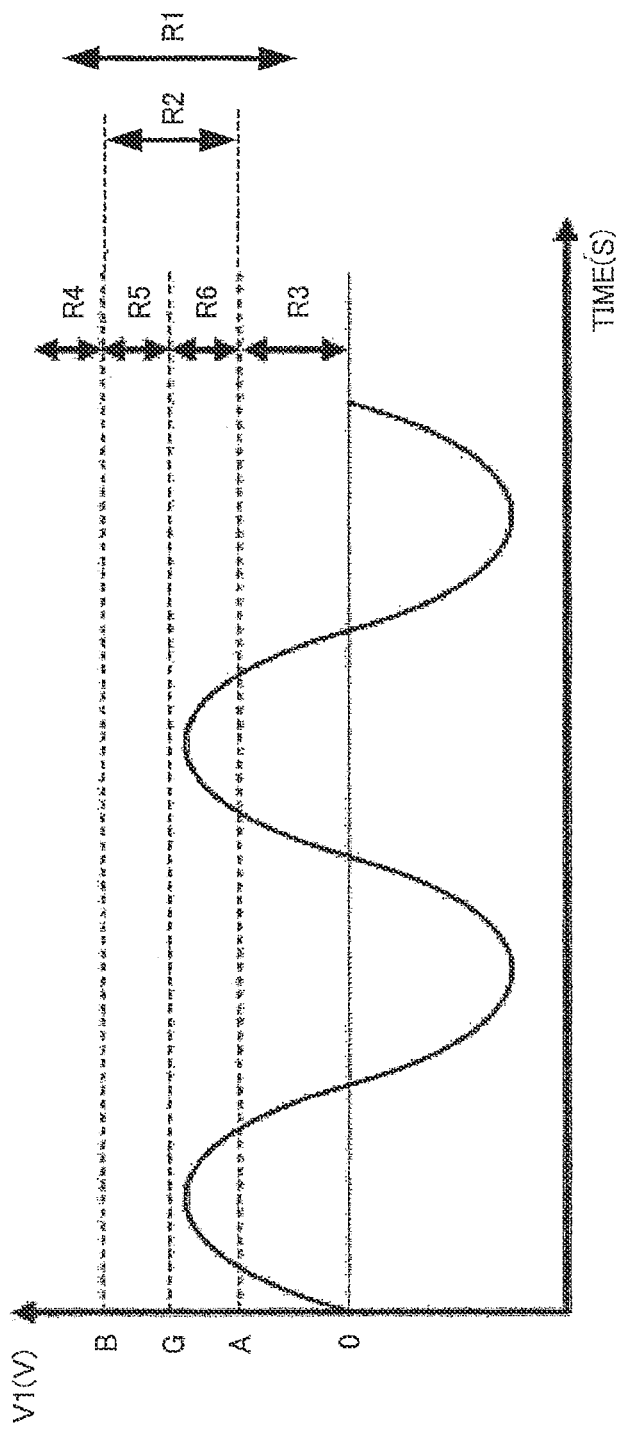
FIG. 7 is a diagram showing thresholds for peak voltage of AC voltage.

For example, as shown in FIG. 7, if peak voltage V1 detected by the AC-input-voltage detecting circuit 80 falls into a prohibiting range R3 that is less than or equal to a voltage threshold A (for example, 120V), or falls into a prohibiting range R4 is larger than or equal to a voltage threshold B (for example, 140V), the PWM duties of PWM signals H4-H6 outputted to the switching elements Q4-Q6 are set to zero, thereby prohibiting supplying of electric power to the motor 5. Thus, failure of the inverter circuit 8 can be prevented.

Additionally, in the present embodiment, although not shown in figures, if rectified voltage V2 detected by the rectified-voltage detecting circuit 72 is less than or equal to a voltage threshold C (for example, 110V), or is larger than or equal to a voltage threshold D (for example, 200V), supplying of electric power to the motor 5 is prohibited in order to protect the inverter circuit 8.

Further, in the present embodiment, although not shown in figures, if control voltage V3 detected by the control-circuit-voltage detecting circuit 73 is less than or equal to a voltage threshold E (for example, 10V, not shown), or is larger than or equal to a voltage threshold F (for example, 20V, not shown), supplying of electric power to the motor 5 is prohibited in order to protect the arithmetic section 78.

Figure 8:
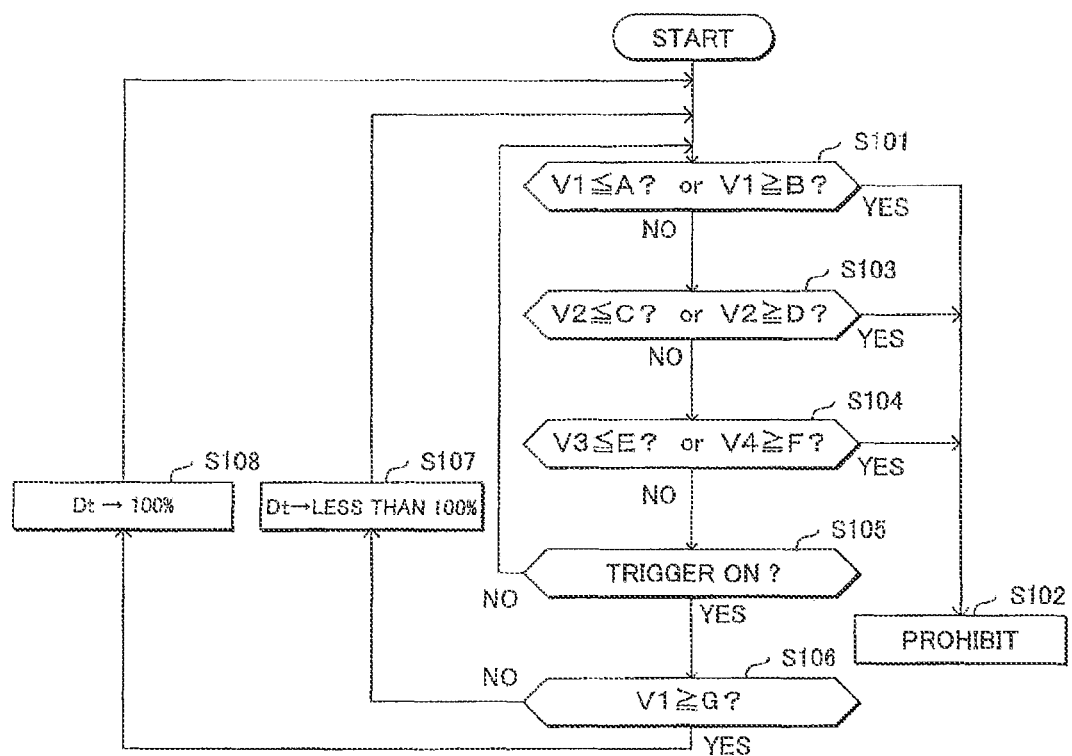
FIG. 8 is a flowchart of a prohibiting control according to a second embodiment of the present invention.

Here, the above-mentioned prohibiting control performed by the arithmetic section 78 will be described in detail while referring to FIG. 8. FIG. 8 is a flowchart of the prohibiting control according to the present embodiment. The flowchart is started when a power switch (not shown) of the electric power tool 1B is turned on.

First, the arithmetic section 78 determines whether the peak voltage V1 detected by the AC-input-voltage detecting circuit 80 is less than or equal to the voltage threshold A, or is larger than or equal to the voltage threshold B (S101).

If the peak voltage V1 is less than or equal to the voltage threshold A, or is larger than or equal to the voltage threshold B (S101: Yes), target duty Dt of the PWM signals H4, H5, and H6 is set to 0%, thereby prohibiting supplying of electric power to the motor 5 (S102). This prevents supply of voltage outside the usable range R1 to the inverter circuit 8.

On the other hand, if the peak voltage V1 is larger than the voltage threshold A and is less than the voltage threshold B (S101: No), the arithmetic section 78 then determines whether the rectified voltage V2 detected by the rectified-voltage detecting circuit 72 is less than or equal to the voltage threshold C, or is larger than or equal to the voltage threshold D (S103).

If the rectified voltage V2 is less than or equal to the voltage threshold C, or is larger than or equal to the voltage threshold D (S103: Yes), the target duty Dt of the PWM signals H4, H5, and H6 is set to 0%, thereby prohibiting supplying of electric power to the motor 5 (S102). This prevents supply of voltage outside the usable range to the inverter circuit 8.

On the other hand, if the rectified voltage V2 is larger than the voltage threshold C and is less than the voltage threshold D (S103: No), the arithmetic section 78 then determines whether the control voltage V3 detected by the control-circuit-voltage detecting circuit 73 is less than or equal to the voltage threshold E, or is larger than or equal to the voltage threshold F (S104).

If the control voltage V3 is less than or equal to the voltage threshold E, or is larger than or equal to the voltage threshold F (S104: Yes), the target duty Dt of the PWM signals H4, H5, and H6 is set to 0%, thereby prohibiting supplying of electric power to the motor 5 (S102). This prevents supply of voltage outside the usable range to the arithmetic section 78.

If the control voltage V3 is larger than the voltage threshold E and is less than the voltage threshold F (S104: No), the arithmetic section 78 then determines whether the trigger switch 3 is turned on (S105).

If the trigger switch 3 is not turned on (S105: No), the arithmetic section 78 returns to S101. If the trigger switch 3 is turned on (S105: Yes), the arithmetic section 78 then determines whether the peak voltage V1 is larger than or equal to a voltage threshold G (S106).

Here, as shown in FIG. 7, if the peak voltage V1 falls into a prevention range R5 that is smaller than the voltage threshold B and larger than or equal to a voltage threshold G (for example, 105V), the inverter circuit 8 is not damaged at this time. However, in this range R5, the peak voltage V1 can easily go out of the preset range R2 if current increases or noises are generated.

Figure 9:
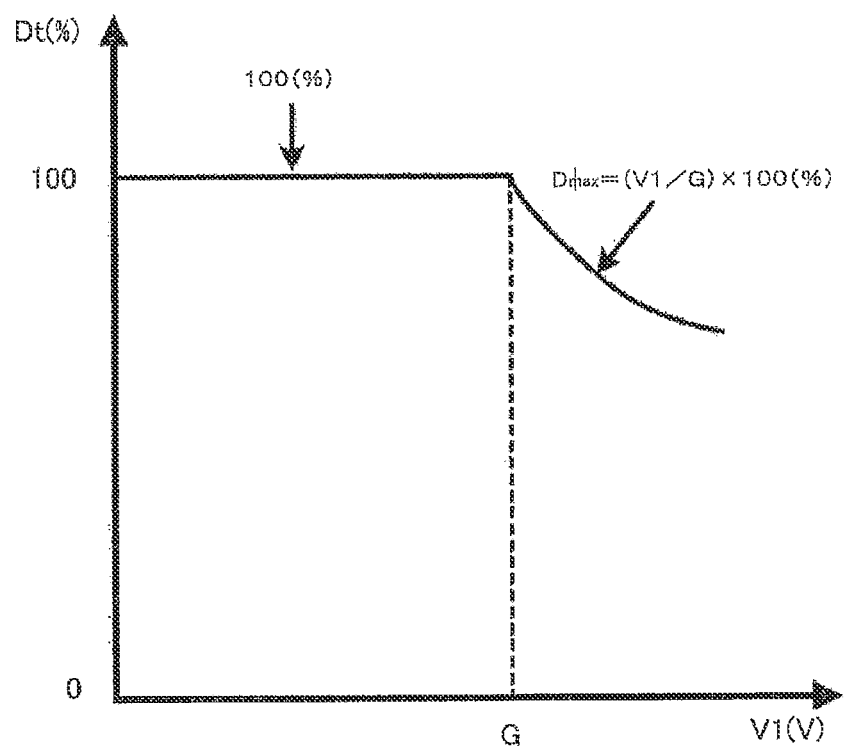
FIG. 9 is a diagram showing a relationship between voltage and target duty.
Figure 10:
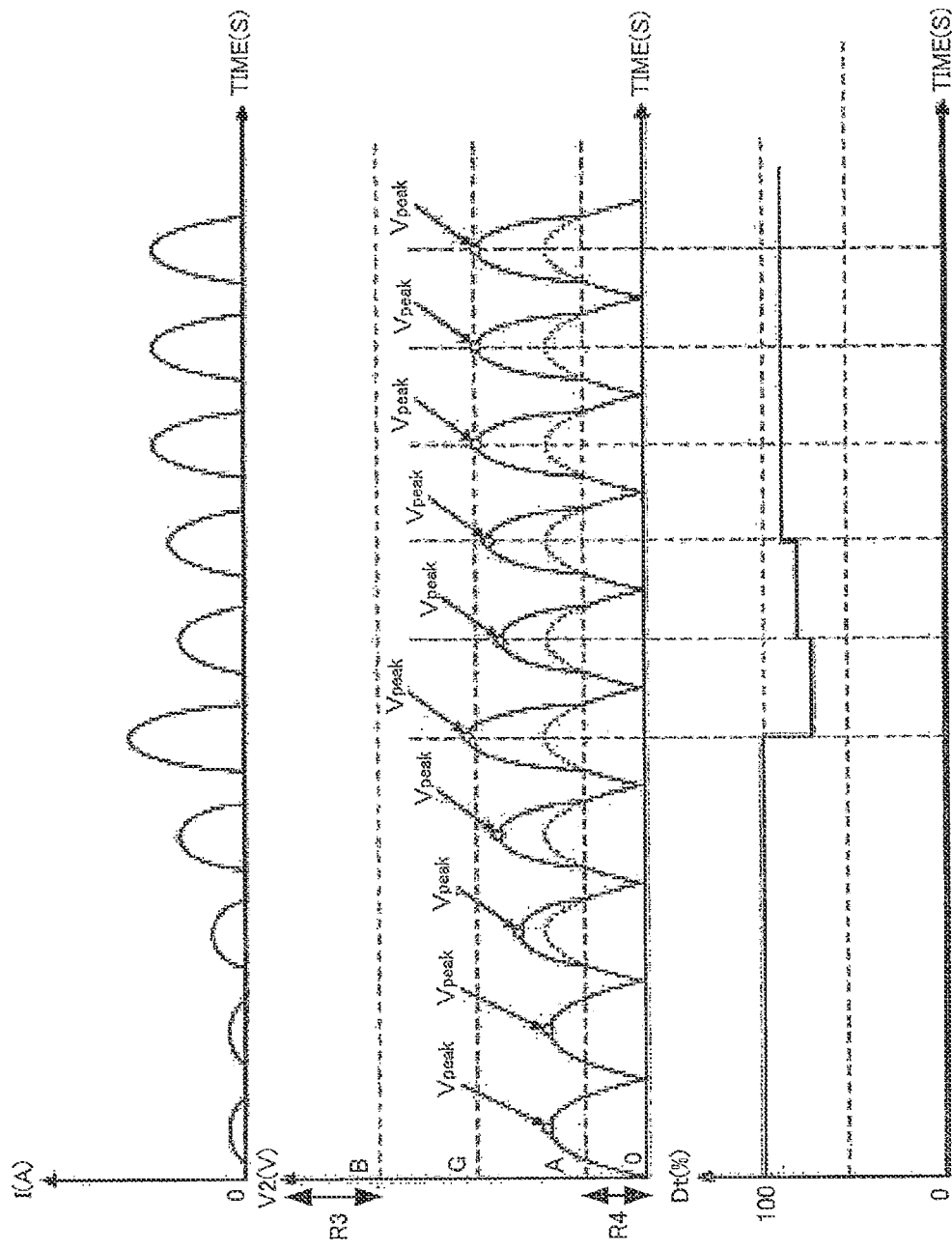
FIG. 10 is a diagram showing a control according to the second embodiment of the present invention.

Accordingly, in the present embodiment, if the peak voltage V1 is larger than or equal to the voltage threshold G (S106: Yes), the arithmetic section 78 sets the target duty Dt to a value less than 100% (S107) and returns to S101. Specifically, as shown in FIG. 9, the arithmetic section 78 sets the target duty Dt to a value indicated by $Dt=(V1/G) \times 100$, and returns to S101. With this operation, as shown in FIG. 10, if the peak voltage V1 is larger than or equal to the voltage threshold G, voltage supplied to the inverter circuit 8 and the arithmetic section 78 can be reduced.

Further, generally, if current increases, voltage also increases due to the effect of L component of the circuit. However, by decreasing the duty as described above, current is also decreased. Therefore, rise of rectified voltage can be also prevented.

As to the rectified voltage V2, by performing a similar control if the rectified voltage V2 is larger than or equal to a voltage threshold H (for example, 170V) as well, voltage supplied to the inverter circuit 8 and the arithmetic section 78 can be reduced. This can prevent increasing of the rotational speed of the motor increases due to high voltage input, which causes mechanical damages in a mechanical section and a motor section.

On the other hand, if the peak voltage V1 is less than the voltage threshold G (S106: No), the arithmetic section 78 sets the target duty Dt to 100% (S108) and returns to S101 because the peak voltage V1 falls into a normal range R6.

In this way, in the electric power tool 1B of the present embodiment, the preset range R2 that falls into the usable range R1 is set, and supplying of electric power to the motor 5 is prohibited if voltage outside the preset range R2 is supplied to the inverter circuit 8 (the arithmetic section 78). This can prevent supply of voltage outside the usable range R1 the inverter circuit 8 (the arithmetic section 78), thereby preventing fail of the inverter circuit 8 (the arithmetic section 78).

Further, in the electric power tool 1B of the present embodiment, in a state where the motor 5 is driven, if voltage supplied to the inverter circuit 8 (the arithmetic section 78) falls into the preset range R2 but is outside the normal range R6, that is, voltage falls into the prevention range R5, a control for reducing the voltage is performed. This can prevent supply of voltage outside the usable range is supplied to the inverter circuit 8 (the arithmetic section 78).

Figure 11:
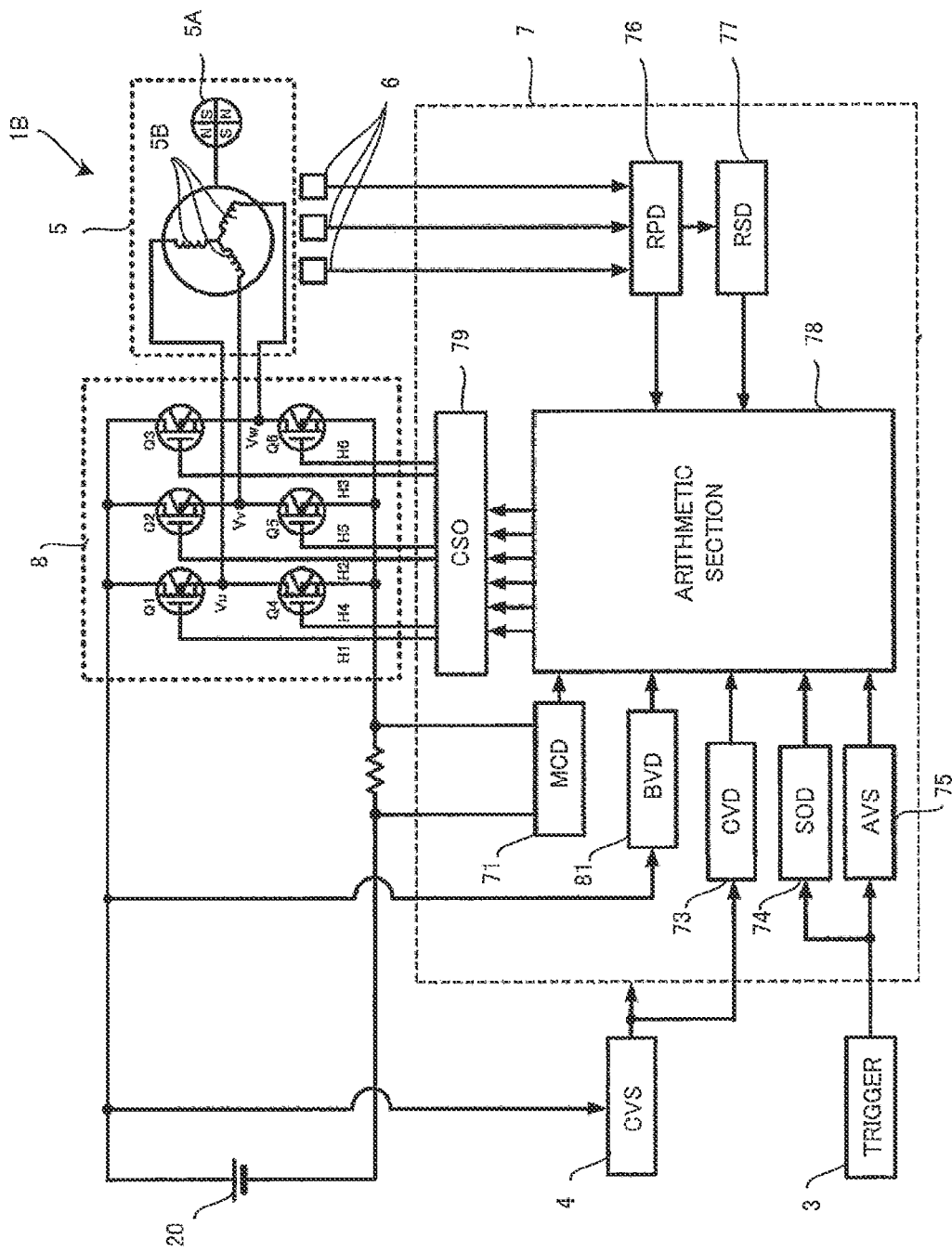
FIG. 11 is a circuit diagram of an electric power tool according to a first modification of the second embodiment of the present invention.

Note that although, in the above-described embodiment, AC power from the commercial power source 2 is converted into DC power, and then is supplied to the inverter circuit 8, DC power from the battery pack 20 may be directly supplied to the inverter circuit 8, as shown in FIG. 11. In this case, a battery-voltage detecting circuit (the voltage detecting unit of the present invention) (referred as "BVD" in FIG. 11) 81 is provided instead of the rectified-voltage detecting circuit 72 shown in FIG. 1. And, if voltage detected by the battery-voltage detecting circuit 81 or voltage detected by the control-circuit-voltage detecting circuit 73 is outside the preset range, supply of electric power to the motor 5 is prohibited.

Figure 12:
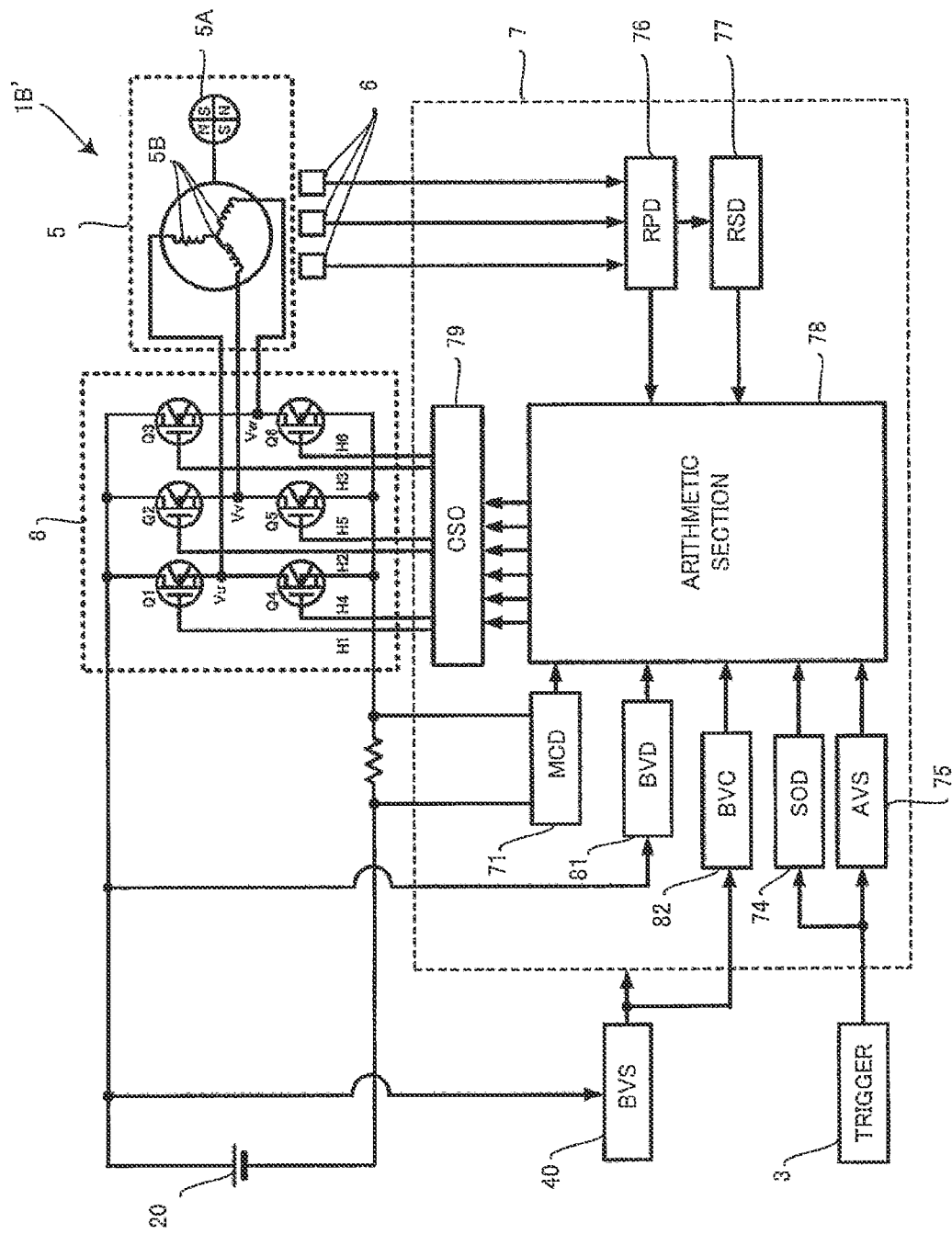
FIG. 12 is a circuit diagram of an electric power tool according to a second modification of the second embodiment of the present invention.

Further, in order to boost the voltage of the battery pack 20, as shown in FIG. 12, a configuration is conceivable that a boost-circuit-voltage supplying circuit (referred as "BVS" in FIG. 11) 40 and a boost-circuit-voltage detecting circuit (referred as "BVC" in FIG. 11) 82 are provided, instead of the control-circuit-voltage supplying circuit 4 and the control-circuit-voltage detecting circuit 73 shown in FIG. 11. In this configuration, voltage boosted by the boost-circuit-voltage supplying circuit 40 is supplied to the arithmetic section 78. In this configuration, if voltage detected by the battery-voltage detecting circuit 81 or voltage detected by the boost-circuit-voltage detecting circuit 82 is outside the preset range, supply of electric power to the motor 5 is prohibited.

Further, although in the above embodiment, prohibition of supplying of electric power to the motor 5 is determined for each voltage at a plurality of locations. However, prohibition of supplying of electric power to the motor 5 may be determined based on a voltage at any one of the plurality of locations.

Next, an electric power tool 1C according to a third embodiment of the invention will be described while referring to FIGS. 13 through 15. The electric power tool 1C has an identical circuit configuration (FIG. 1) as the electric power tool 1A according to the first embodiment. Therefore, the descriptions of the circuit configuration are omitted.

Figure 13:
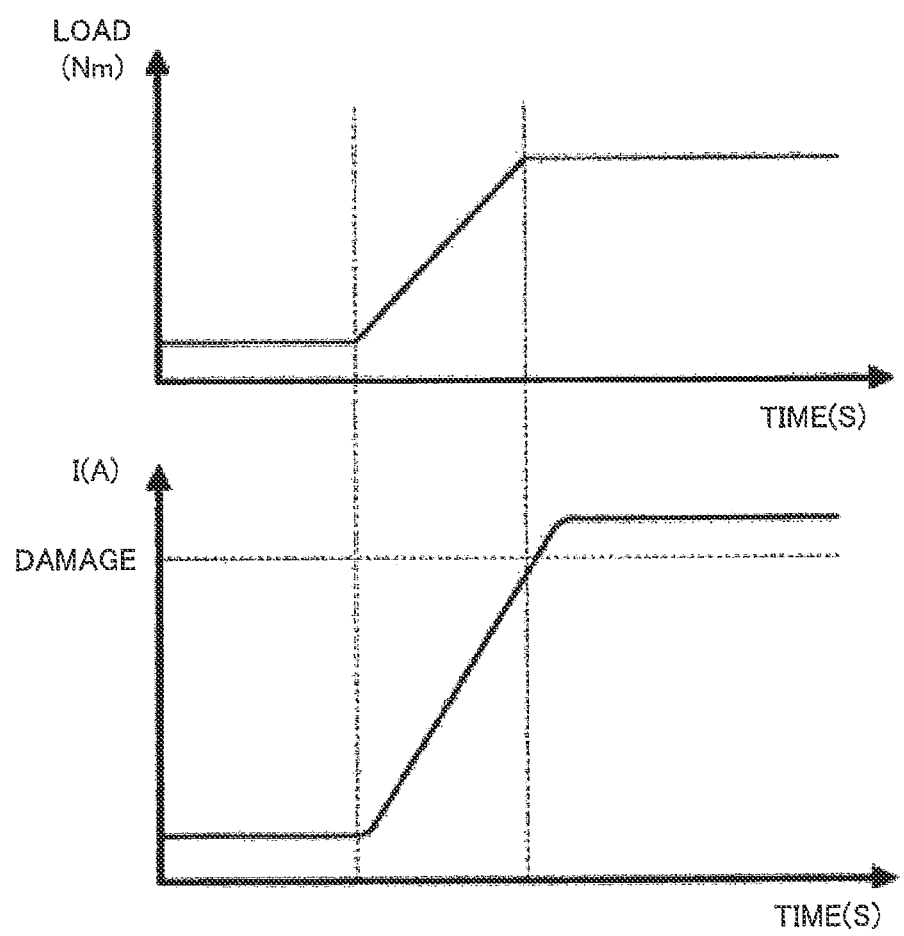
FIG. 13 is a diagram showing a relationship between load and current.

As shown in FIG. 13, current flowing through the motor 5 is proportional to load applied to the motor 5. The motor 5 can be damaged when great current flows through the motor 5 (great load is applied on the motor 5).

Figure 14:
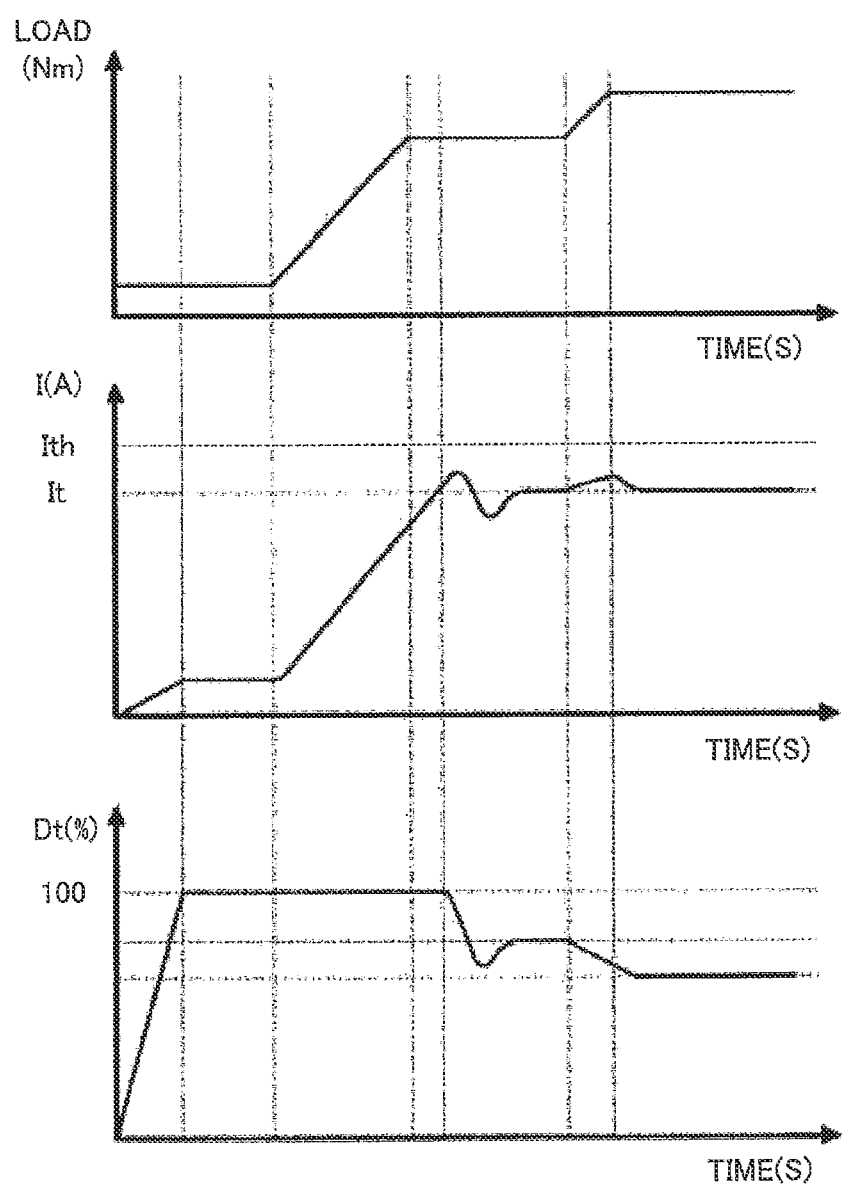
FIG. 14 is a diagram showing a control according to a third embodiment of the present invention.
Figure 15:
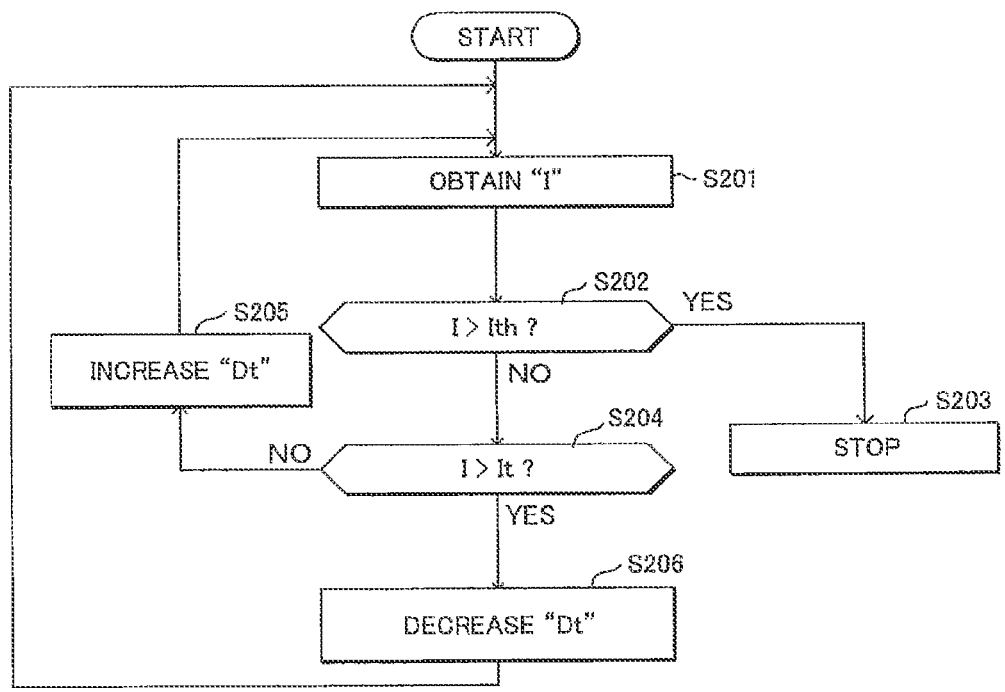
FIG. 15 is a flowchart of the control according to the third embodiment of the present invention.

Thus, as shown in FIG. 14, the electric power tool 1C according to the third embodiment performs a control for setting a target current It smaller than an overcurrent threshold Ith, and decreasing PWM duties of the PWM signals H4-H6 outputted to the switching elements Q4-Q6 if current detected by the motor-current detecting circuit 71 becomes larger than the target current It. With this construction, current larger than the target current It is prevented from flowing through the motor 5, thereby preventing overcurrent from flowing through the motor 5. Further, because a possibility of stop of the motor 5 due to overcurrent decreases, a smooth operation can be ensured. Further, it becomes possible to protect the inverter circuit 8 vulnerable to overcurrent.

Here, the above-mentioned control performed by the arithmetic section 78 will be described in detail while referring to FIG. 15. FIG. 15 is a flowchart of the voltage control according to the third embodiment. This flowchart is started when the trigger switch 3 is turned on.

First, the arithmetic section 78 obtains current I flowing through the motor 5 from the motor-current detecting circuit 71 (S201), and determines whether the current I is larger than the overcurrent threshold Ith (S202).

If the current I is larger than the overcurrent threshold Ith (S202: Yes), the arithmetic section 78 sets the target duty Dt of the PWM signals H4-H6 to 0%, thereby stopping supply of electric power to the motor 5 (S203). With this operation, overcurrent is prevented from flowing through the motor 5.

On the other hand, if the current I is less than or equal to the overcurrent threshold Ith (S202: No), the arithmetic section 78 then determines whether the current I is larger than the target current It (S204).

If the current I is less than or equal to the target current It (S204: No), the arithmetic section 78 sets (increases) the target duty Dt for increasing the current I to the target current It (S205) and returns to S201.

Specifically, the arithmetic section 78 set the target duty Dt based on the following Equation (1): $Dt=(It-I) \times P+D$ (P is a feedback gain, and D is a current duty), and increases the duty by Da % toward the target duty Dt. By increasing the duty by Da % in this way, an excessive inrush current can be prevented from flowing through the motor 5.

On the other hand, if the current I is larger than the target current It (S204: Yes), the arithmetic section 78 decreases the target duty Dt to decrease the target current It (S205) and returns to S201.

In this way, in the electric power tool 1C according to the third embodiment, if the current I flowing through the motor 5 is larger than the target current It, the target duty Dt is decreased. Thus, because current flowing through the motor 5 is smaller than the target current It, overcurrent can be prevented from flowing through the motor 5. Further, because a possibility of stop of the motor 5 due to overcurrent is decreased, a smooth operation can be ensured. Further, it becomes possible to protect the inverter circuit 8 vulnerable to overcurrent.

Note that, in the above embodiment, the target duty Dt is decreased at a constant rate (Da %) if the current I is larger than the target current It. However, the decreasing rate may be changed in accordance with the current I.

Further, in the above embodiment, supply of voltage to the motor 5 is stopped if the current I is larger than the overcurrent threshold Ith. However, supply of voltage to the motor 5 may be stopped if the current I is larger than the target current It and is less than or equal to the overcurrent threshold Ith for a preset period or longer. In this case, the period may be changed depending on vulnerability of the motor 5 and the inverter circuit 8 to overcurrent.

Figure 17:
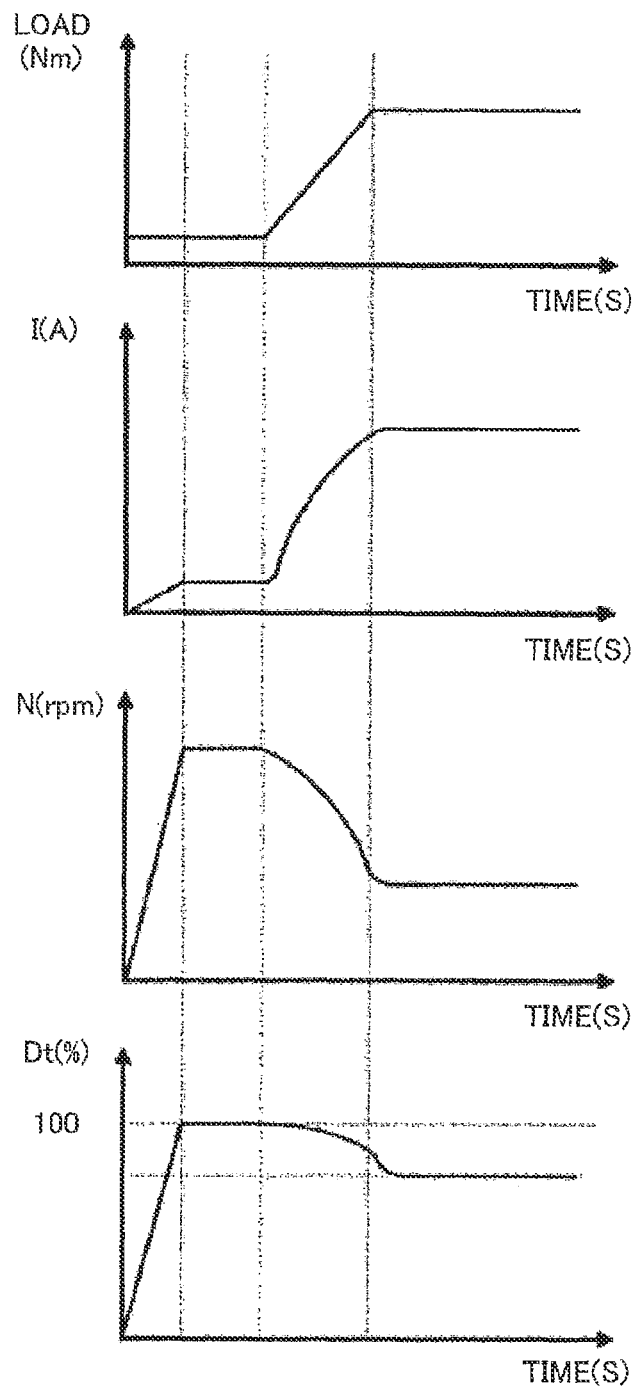
FIG. 17 is a diagram showing the control according to the fourth embodiment of the present invention.
Figure 18:
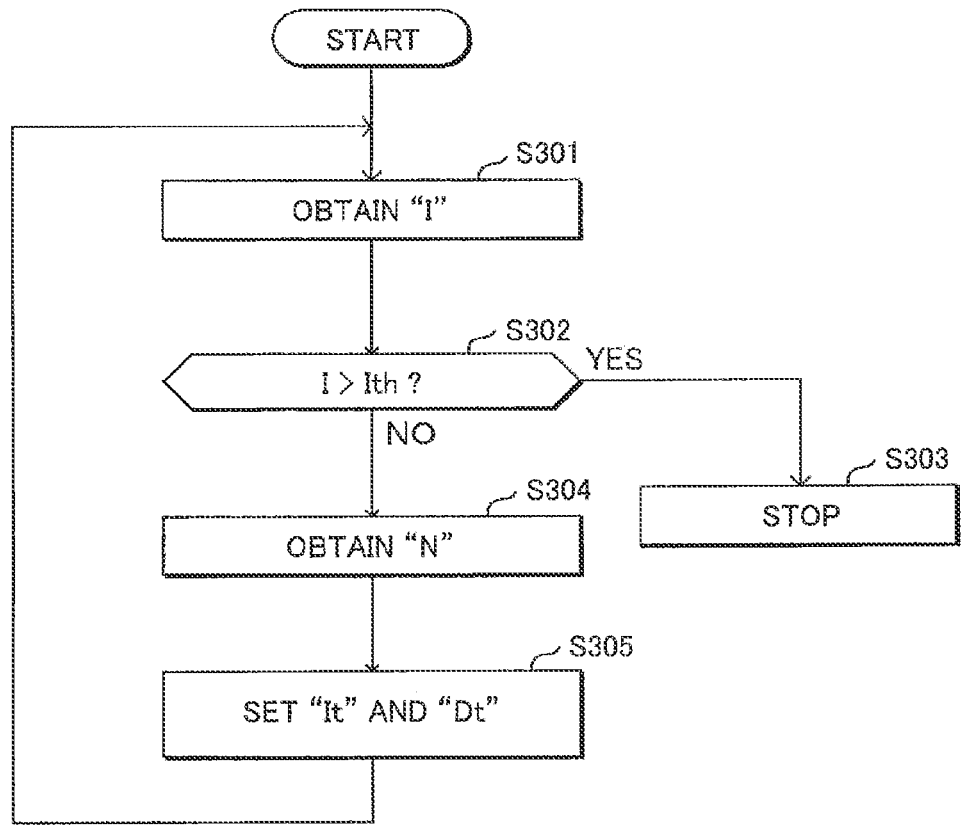
FIG. 18 is a flowchart of the control according to the fourth embodiment of the present invention.

Next, an electric power tool 1D according to a fourth embodiment of the invention will be described while referring to FIGS. 16 through 18. The electric power tool 1D has an identical circuit configuration (FIG. 1) as the electric power tool 1A according to the first embodiment. Therefore, the descriptions of the circuit configuration are omitted.

If the same voltage is supplied to the motor 5 in a case where the rotational speed of the motor 5 is low and in a case where the rotational speed of the motor 5 is high, larger current flows through the motor 5 in the case where the rotational speed is low. On the other hand, change in the target duty Dt takes some time to be reflected in a current value. Accordingly, when the rotational speed of the motor 5 is low, even if the control according to the third embodiment is performed, there is a possibility that the control cannot follow and overcurrent flows through the motor 5.

Figure 16:
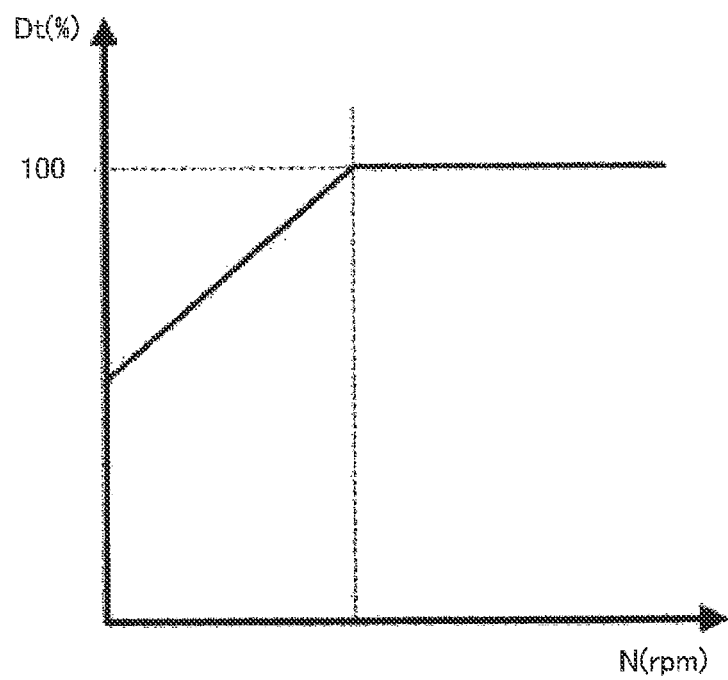
FIG. 16 is a diagram showing a relationship between a target duty and a rotational speed when a control according to a fourth embodiment of a present invention is performed.

Hence, in the present embodiment, as shown in FIG. 16, the target duty Dt is changed in accordance with the rotational speed of the motor 5. Specifically, the target duty Dt is set to a small value while the rotational speed of the motor 5 is low, so that large voltage is not supplied to the motor 5. With this operation, as shown in FIG. 17, while the rotational speed of the motor 5 is low, large current can be prevented from flowing through the motor 5. Hence, overcurrent through the motor 5 can be prevented appropriately.

Next, a control according to the present embodiment will be described while referring to FIG. 18. FIG. 18 is a flowchart of the voltage control according to the present embodiment. This flowchart starts when the trigger switch 3 is turned on. Note that steps S301-S303 are identical to steps S201-S203 in FIG. 15, and thus descriptions are omitted.

If the current I is less than or equal to the overcurrent threshold Ith (S302: No), the arithmetic section 78 obtains rotational speed N of the motor 5 from the motor-rotational-speed detecting circuit 77 (S304). Then, the arithmetic section 78 sets, based on the rotational speed N, the target current It and the target duty Dt for increasing the current I to the target current It (S305), and returns to S301. In the present embodiment, as shown in FIG. 16, the target duty Dt is increased proportionally to 100% when the rotational speed is 0 rpm to a preset rpm, and is fixed at 100% when the rotational speed is higher than the preset rpm.

In this way, in the electric power tool 1D according to the fourth embodiment, the target duty Dt is changed in accordance with the rotational speed of the motor 5. With this operation, while the rotational speed of the motor 5 is low, large voltage is not supplied to the motor 5. Hence, overcurrent can be prevented appropriately from flowing through the motor 5.

Next, an electric power tool 1E according to a fifth embodiment of the invention will be described while referring to FIGS. 19 through 21. The electric power tool 1D has an identical circuit configuration (FIG. 1) as the electric power tool 1A according to the first embodiment. Therefore, the descriptions of the circuit configuration are omitted.

In the first embodiment, the smoothing capacitor 23 having small capacity is used. Especially, when the capacity is less than or equal to 10 uF (microfarad), pulsation voltage including ripples can be outputted from the smoothing capacitor 23.

Figure 19:
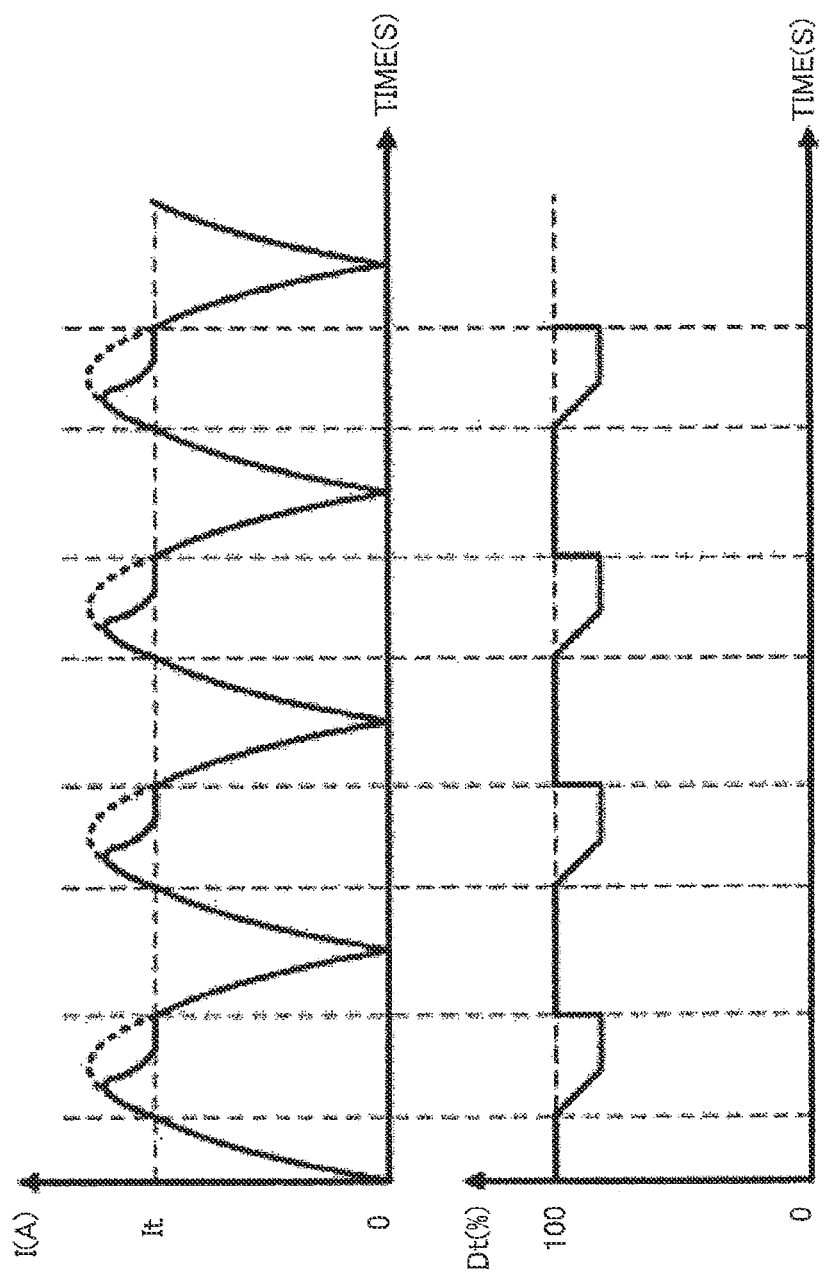
FIG. 19 is a diagram showing waveform of current when a control according to the third embodiment is performed for AC power.

If the control according to the third embodiment is performed with the smoothing capacitor 23 having small capacity, as shown in FIG. 19, the current I starts decreasing after the current I becomes larger than the target current It.

However, in the control according to the third, the target duty Dt is increased immediately after the current I decreases to a value less than equal to the target current It. Therefore, as shown in FIG. 19, even if the current I is decreases to a value less than or equal to the target current It in one ripple, the current I exceeds the target current It in next ripple again. In other words, current exceeding the target current It flows through the motor 5 at each cycle of AC (alternate current). As the result, the motor 5 can be stopped due to overcurrent, or, at least, unnecessary heat is generated in the motor 5.

Figure 20:
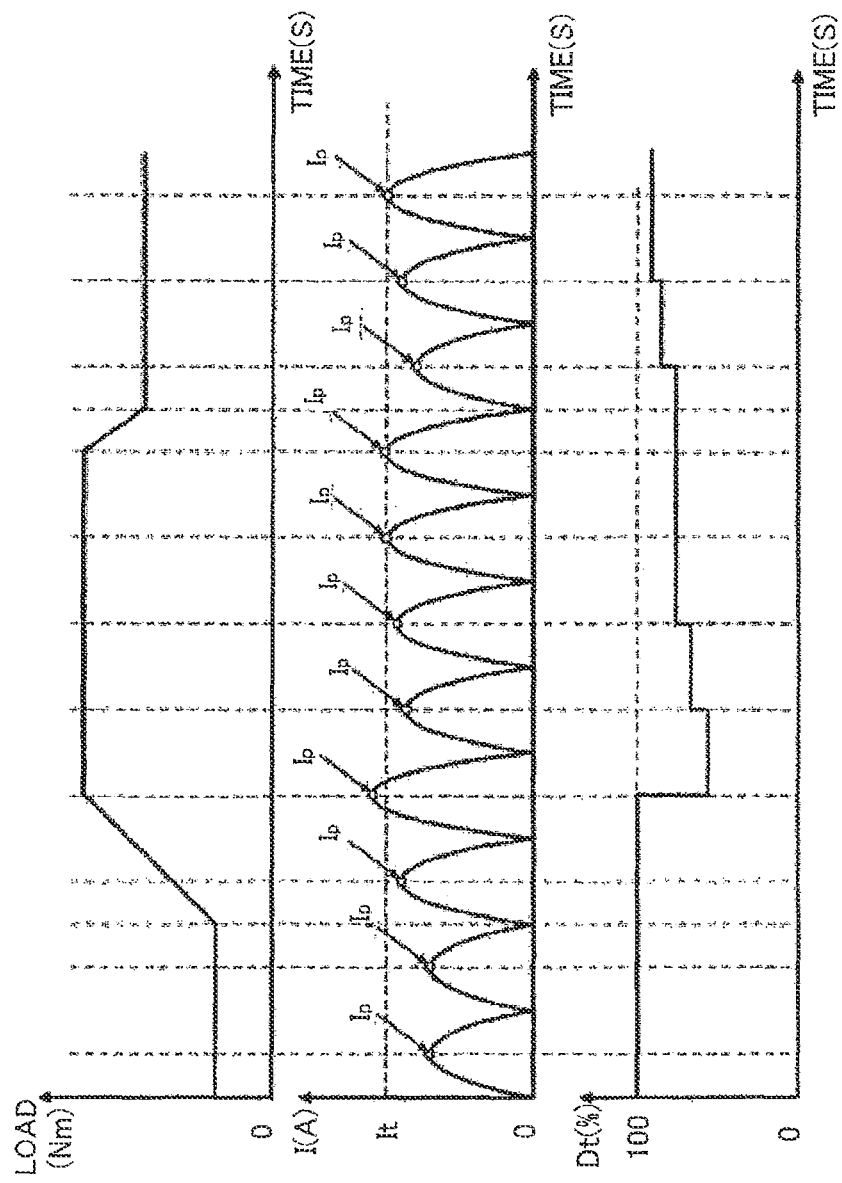
FIG. 20 is a diagram showing a control according to a fifth embodiment of the present invention.
Figure 21:
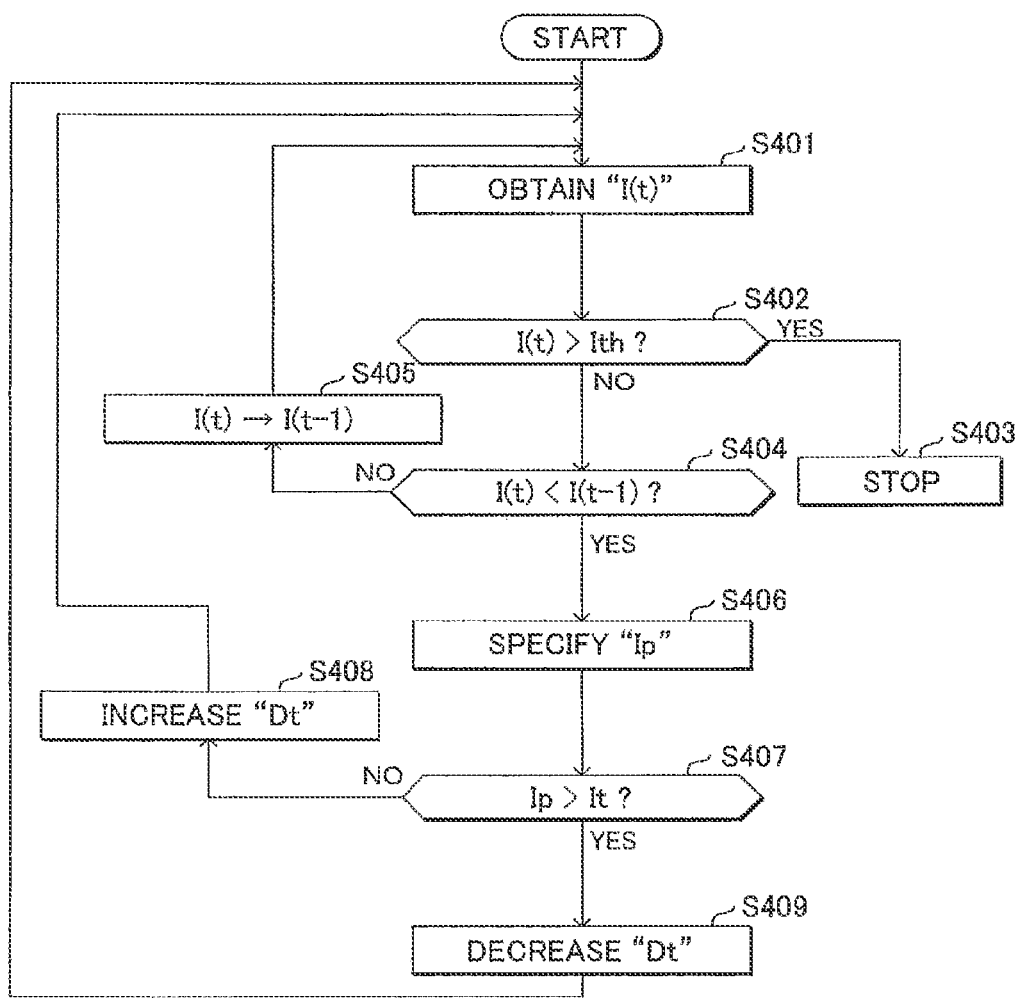
FIG. 21 is a flowchart of the control according to the fifth embodiment of the present invention.

Hence, as shown in FIG. 20, the electric power tool 1E according to the present embodiment determines whether or not a peak current Ip is larger than the target current It, reduces the target duty Dt when the peak current Ip is larger than the target current It, keeps the decreased duty Dt until a next peak current Ip is detected even if the current I decreases to a value less than or equal to the target current It, and increases the duty Dt stepwise if the peak current Ip is smaller than the target current It. With this operation, current exceeding the target current It is prevented from flowing through the motor 5 at each cycle of AC.

Note that a capacitor of 0.47 uF (microfarad) is used in the present embodiment. If such capacitor is used, large pulsation voltage including large ripples can be generated. For example, if a ripple is larger than or equal to 70%, it can be said that the large pulsation is generated. The size of ripple is denoted by $(dV/V^*) \times 100\%$ ($V^*$ is a maximum voltage inputted into the electric power tool 1E, and dV is a rate of change of voltage).

Here, a control according to the present embodiment will be described in detail while referring to FIG. 21. FIG. 21 is a flowchart of the voltage control according to the present embodiment. This flowchart starts when the trigger switch 3 is turned on. Note that steps S401-S403 are identical to steps S201-S203 in FIG. 15, and thus descriptions are omitted.

If the current I(t) is less than or equal to the overcurrent threshold Ith (S402: No), then the arithmetic section 78 determines whether the current I(t) is smaller than a previous current I(t−1) (S404).

If the current I(t) is larger than or equal to the previous current I(t−1) (S404: No), the arithmetic section 78 stores the current I(t) as the previous current I(t−1) (S405), and returns to S401.

On the other hand, if the current I(t) is smaller than the previous current I(t−1) (S404: Yes), the arithmetic section 78 specifies the previous current I(t−1) as the peak current Ip (S406). Note that, in the present embodiment, the current I(t) is detected in a sampling period such that a value sufficiently close to the actual peak current can be detected.

Next, the arithmetic section 78 determines whether the peak current Ip is larger than the target current It (S407).

If the peak current Ip is less than or equal to the target current It (S407: No), the arithmetic section 78 sets the target duty Dt for increasing the peak current Ip to the target current It (S408), and returns to S401.

On the other hand, if the peak current Ip is larger than the target current It (S407: Yes), the arithmetic section 78 decreases the target duty Dt to decrease the target current It (S409), and then returns to S401.

As described above, the electric power tool 1E according to the present embodiment determines whether or not a peak current Ip is larger than the target current It, reduces the target duty Dt when the peak current Ip is larger than the target current It, keeps the decreased duty Dt until a next peak current Ip is detected even if the current I decreases to a value less than or equal to the target current It, and increases the duty Dt stepwise if the peak current Ip is smaller than the target current It. With this operation, current exceeding the target current It is prevented from flowing through the motor 5 at each cycle of AC.

Next, an electric power tool 1F according to a sixth embodiment of the invention will be described while referring to FIGS. 22 and 23. The electric power tool 1F has an identical circuit configuration (FIG. 1) as the electric power tool 1A according to the first embodiment. Therefore, the descriptions of the circuit configuration are omitted.

In the sixth embodiment, the third embodiment and the fourth embodiment are implemented concurrently. Specifically, the target duty Dt is changed in accordance with the rotational speed of the motor 5, and then, if the current I is larger than the target current It, the target duty Dt is reduced.

Figure 22:
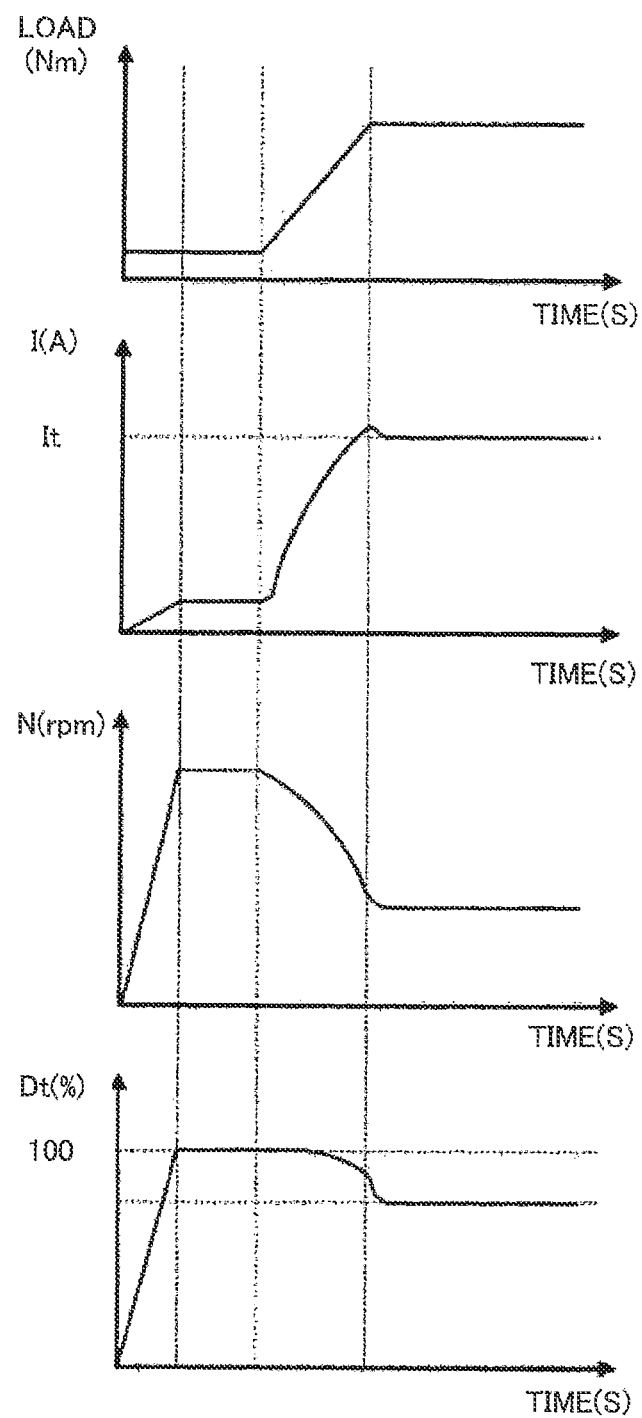
FIG. 22 is a diagram showing a control according to a sixth embodiment of the present invention.
Figure 23:
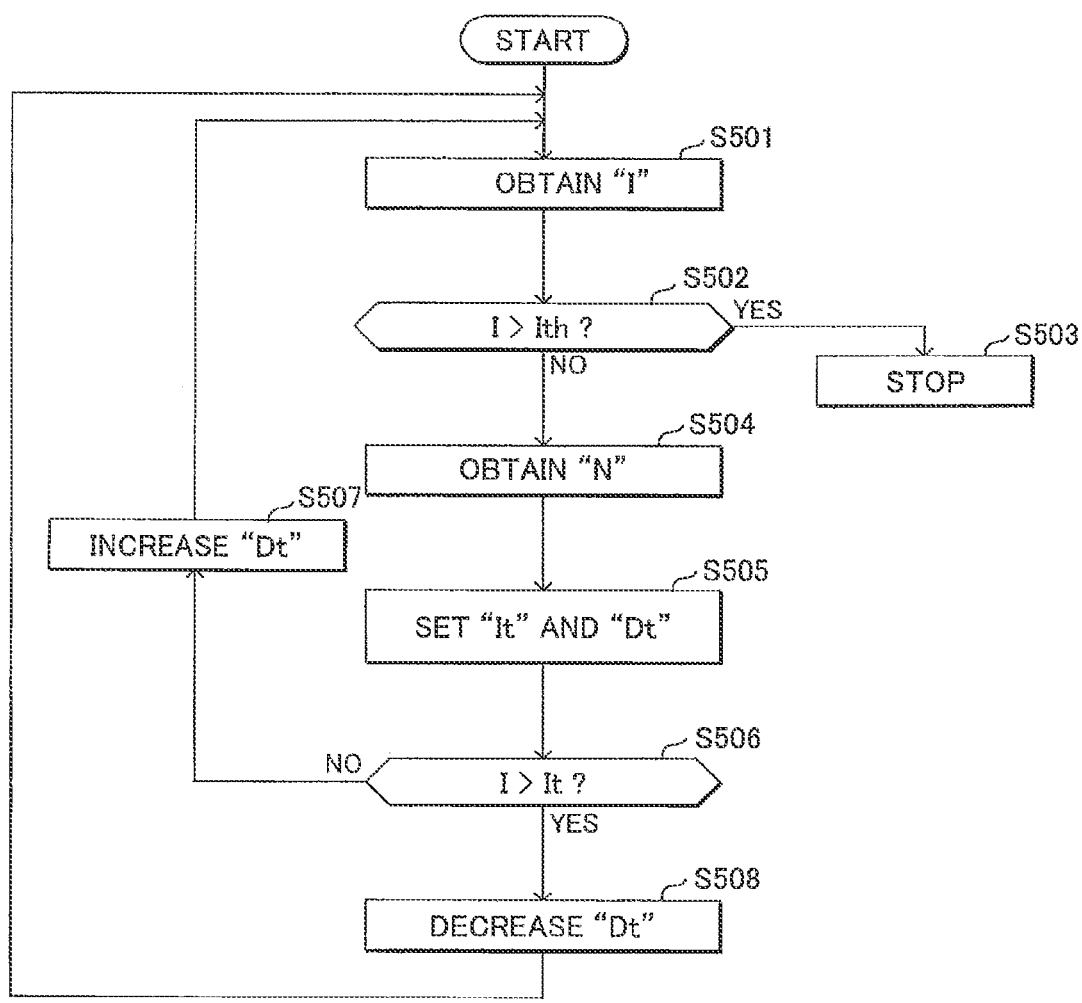
FIG. 23 is a flowchart of the control according to the sixth embodiment of the present invention.

In this case, as shown in FIG. 22, the arithmetic section 78 sets the target duty Dt such that large voltage is not supplied to the motor 5 while the rotational speed of the motor 5 is low, and fixes the duty at 100% after the rotational speed of the motor 5 becomes larger than or equal to a preset value. After the duty is fixed at 100%, the arithmetic section 78 decreases the target duty Dt if the current I becomes larger than the target current It.

Here, a control according to the sixth embodiment will be described in detail while referring to FIG. 23. FIG. 23 is a flowchart of the voltage control according to the sixth embodiment. This flowchart starts when the trigger switch 3 is turned on.

First, the arithmetic section 78 obtains the current I flowing through the motor 5 from the motor-current detecting circuit 71 (S501), and determines whether the current I is larger than the overcurrent threshold Ith (S502).

If the current I is larger than the overcurrent threshold Ith (S502: Yes), the arithmetic section 78 sets the target duty Dt of the PWM signals H4, H5, and H6 to 0%, thereby stopping supply of electric power to the motor 5 (S503).

On the other hand, the current I is less than or equal to the overcurrent threshold Ith (S502: No), the arithmetic section 78 obtains the rotational speed N of the motor 5 from the motor-rotational-speed detecting circuit 77 (S504) and sets the target current It and the target Dt based on the rotational speed N (S505).

Next, the arithmetic section 78 determines whether the current I is larger than the target current It set in S505 (S506).

If the current I is less than or equal to the target current It (S506: No), the arithmetic section 78 increases the target duty Dt (S507), and returns to S501.

On the other hand, if the current I is larger than the target current It (S506: Yes), the arithmetic section 78 decreases the target duty Dt (S508), and then returns to S501.

In this way, by implementing the third embodiment and the fourth embodiment concurrently, overcurrent can be prevented more effectively from flowing through the motor 5.

Note that, in the above embodiment, the target duty Dt is decreased at a constant decreasing rate (Da %) if the current I is larger than the target current It. However, the decreasing rate may be changed in accordance with the current I.

Further, in the above embodiment, supply of voltage to the motor 5 is stopped if the current I is larger than the overcurrent threshold Ith. However, supply of voltage to the motor 5 may be stopped if the current I is larger than the target current It and is less than or equal to the overcurrent threshold Ith for a preset period or longer. In this case, the preset period may be changed depending on vulnerability of the motor 5 and the inverter circuit 8 to overcurrent.

While the electric power tool of the invention has been described in detail with reference to the above embodiments thereof, it would be apparent to those skilled in the art that various changes and modifications may be made therein without departing from the scope of the claims.

For example, if the electric power tools 1A-F are drivers, a lock detection may be performed at the end of a driving operation. In this case, for example, the lock detection could be performed (1) if the rotational speed N is less than or equal to a preset value, (2) if the rotational speed N is less than or equal to a preset value, and the current I is larger than or equal to a preset value, or (3) if the current I continues being larger than or equal to a preset value for a preset period or longer.

Further, any two or more of the electric power tools 1A-1F can be arbitrarily combined with one another.

1A-1E Electric Power Tool
   5 Motor
   8 Inverter Circuit
   10 Rectifier Circuit
   11 Smoothing Capacitor

What is claimed is:

1. An electric power tool comprising:
   a brushless motor having a plurality of stator windings;
   a rectifier circuit configured to rectify an AC voltage;
   a smoothing capacitor connected to the rectifier circuit and configured to smooth the AC voltage rectified by the rectifier circuit to a pulsation voltage and to output the pulsation voltage and a motor-current;
   an inverter circuit connected to the smoothing capacitor and the brushless motor, the inverter circuit being configured to perform switching operations to output the pulsation voltage and the motor-current to the plurality of stator windings by rotation;
   an end tool configured to be driven in accordance with the rotation of the brushless motor;
   a motor-current detecting circuit configured to detect the motor-current flowing through the brushless motor; and
   an arithmetic section connected to the inverter circuit and the motor-current detecting circuit, the arithmetic section being configured to control the inverter circuit;
   wherein, when the motor-current exceeds a target current, the arithmetic section is configured to restrain the motor-current, and thereafter stop restraining the motor-current flowing through the brushless motor when the detected motor-current is restrained to a value less than or equal to the target current, and
   wherein the arithmetic section is configured:
   to set the target current to a first current value while the rotational speed of the brushless motor is a first speed value, and
   to set the target current to a second current value smaller than the first current value while the rotational speed of the brushless motor is a second speed value lower than the first speed value.

2. The electric power tool according to claim 1, wherein the arithmetic section is configured to control the inverter circuit to restrain a duty ratio of a PWM signal to restrain the motor-current flowing through the brushless motor when the detected motor-current is larger than the target current.

3. The electric power tool according to claim 1, wherein the arithmetic section is configured to control the inverter circuit to restrain the motor-current flowing through the brushless motor when the detected motor-current is larger than the target current.

4. The electric power tool according to claim 1, wherein the arithmetic section is configured to set the target current based on a rotational speed of the brushless motor.

5. The electric power tool according to claim 1, wherein the arithmetic section is configured to gradually restrain the motor-current flowing through the brushless motor when the detected motor-current is larger than the target current.

6. The electric power tool according to claim 1, wherein the arithmetic section is configured to restrain the pulsation voltage outputted from the inverter circuit to restrain the motor-current flowing through the brushless motor.

7. The electric power tool according to claim 1, wherein the arithmetic section is configured to control the inverter circuit to allow the motor-current to flow through the brushless motor without restraining the motor-current, when the motor-current is not larger than the target current.

8. The electric power tool according to claim 1, wherein the arithmetic section is configured to increase the motor-current when the motor-current becomes less than or equal to the target current.

\* \* \* \* \*